United States Patent
Asano et al.

(12) 
(10) Patent No.: US 6,373,952 B2
(45) Date of Patent: *Apr. 16, 2002

(54) DATA TRANSMITTING APPARATUS, DATA TRANSMITTING METHOD, DATA RECEIVING APPARATUS, DATA RECEIVING METHOD, DATA TRANSMISSION APPARATUS, AND DATA TRANSMISSION METHOD

(75) Inventors: Tomoyuki Asano; Makoto Ishii; Ichiro Kubota, all of Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/952,298
(22) PCT Filed: Mar. 17, 1997
(86) PCT No.: PCT/JP97/00850
  § 371 Date: May 29, 1998
  § 102(e) Date: May 29, 1998
(87) PCT Pub. No.: WO97/34279
  PCT Pub. Date: Sep. 18, 1997

(30) Foreign Application Priority Data

Mar. 15, 1996 (JP) ............................................. 8-059745
Mar. 15, 1996 (JP) ............................................. 8-059746
Jun. 14, 1996 (JP) ............................................. 8-154688

(51) Int. Cl.[7] .................................................. G06F 1/24
(52) U.S. Cl. .......................................... 380/278; 380/33
(58) Field of Search ........................... 380/278, 33, 283

(56) References Cited

U.S. PATENT DOCUMENTS 5,117,458 A * 5/1992 Takaragi et al. ............ 380/228
5,218,638 A * 6/1993 Matsumoto et al. ........ 380/228

(List continued on next page.)

FOREIGN PATENT DOCUMENTS

| JP | 60-208137 | 10/1985 | ............. H04L/9/02 |
| JP | 1-231490 | 9/1990 | ............. H04N/7/16 |

(List continued on next page.)

OTHER PUBLICATIONS

Schneier, Applied Cryptography, John Wiley and Sons, Oct. 1995, pp. 31–34.*

Primary Examiner—Thomas R. Peeso
(74) Attorney, Agent, or Firm—Bell, Boyd & Lloyd LLC

(57) ABSTRACT

The present invention provides a data transmission apparatus which enhances the safety with respect to leakage of encoded transmitted data by raising the safety of transmission of an encoding key or a decoding key. It provides a large capacity transmission line 152 such as a satellite transmission line for transmitting a large amount of data and a small capacity transmission line 156 such as a public telephone line for transmitting an encoding key or decoding key or information for the generation of them. The encoding session key 107 is generated by using a work key and a destination address of a receiving apparatus of the destination. Further, the decoding session key 108 is generated using one's own address and the work key. The work key is preferably encoded and transmitted through the small capacity transmission line 156. In the transmitting apparatus 101, in addition to the encoding of the data 105 which should be transmitted by using the encoding session converted as described above, transmission control information such as destination data is added and is transmitted to the receiving apparatus 102 through the large capacity transmission line 152. In the receiving apparatus 102, the encoded data 110 is decoded by using the decoding session key 108 converted as described above.

72 Claims, 22 Drawing Sheets

U.S. PATENT DOCUMENTS

| | | | |
|---|---|---|---|
| 5,323,464 A | * | 6/1994 | Elander et al. ............. 713/191 |
| 5,526,435 A | * | 6/1996 | Tsumura ..................... 380/278 |
| 5,659,615 A | * | 8/1997 | Dillon ........................ 713/162 |

FOREIGN PATENT DOCUMENTS

| | | | |
|---|---|---|---|
| JP | 4-92886 | 3/1992 | ........... C30B/23/08 |
| JP | 4-92887 | 3/1992 | ........... C30B/27/02 |
| JP | 4-274636 | 9/1992 | ........... H04L/12/28 |
| JP | 5-292047 | 11/1993 | ........... H04H/1/00 |
| JP | 6-37750 | 2/1994 | ............. H04L/9/06 |
| JP | 6-152592 | 5/1994 | ............. H04L/9/06 |
| JP | 6-303231 | 10/1994 | ............. H04L/9/06 |
| JP | 6-311157 | 11/1994 | ............. H04L/9/00 |
| JP | 7-107082 | 4/1995 | ............. H04L/9/00 |
| JP | 7-170280 | 7/1995 | ........... H04L/12/40 |
| JP | 7-283809 | 10/1995 | ............. H04L/9/06 |
| JP | 8-32574 | 2/1996 | ............. H04L/9/00 |

\* cited by examiner

902 : SECTION SYNTAX INDICATOR
903 : PRIVATE INDICATOR
904 : RESERVED

1002 : ERROR INDICATOR
1003 : PAYLOAD START INDICATOR
1004 : TRANSPORTPACKET PRIORITY
1006 : SCRAMBLE CONTROL
1007 : ADAPTATION FIELD CONTROL
1008 : CONTINUITY COUNTER

DATA TRANSMITTING APPARATUS, DATA TRANSMITTING METHOD, DATA RECEIVING APPARATUS, DATA RECEIVING METHOD, DATA TRANSMISSION APPARATUS, AND DATA TRANSMISSION METHOD

TECHNICAL FIELD

The present invention relates to a data transmission apparatus for transmitting data and a method of the same, more particularly relates to a data transmission apparatus which suitably manages an encoding key and a decoding key used where a large amount of data is encoded and transferred and a method of the same.

BACKGROUND ART

Conventionally, in a TV broadcast or other data distribution service using a communications satellite, the flow of data was made in only one direction, that is, from the data distributor to the user. In recent years, since the transmission of digital data using communications satellite has becomes possible, transmission using the communications satellites has started for not only analog video and audio data such as TVS and movies, but also the text utilized in computers and digital video and audio data.

Here, conventional data distribution services using communications satellites such as TV broadcasting has been of the form with data distributed by a data distributor being simultaneously received and used by a large number of users. Contrary to this, where the digital data used in computers is distributed via a communications satellite, a function for distributing the data from the data distributor to a single or a plurality of users is required.

In the conventional transmission system using a communications satellite, however, there is a problem in that since the distribution is performed for analog data and since the data distribution is performed in only one direction from the data distributor to the user. Since no function for checking the errors in transmission is provided, the reliability of the data transmission is low. In the distribution of digital data, if even one bit of error is caused in the data due by the transmission, the received data no longer has any meaning.

In order to distribute such digital computer data by a wireless system with a high quality, it is necessary to secure a communication path for not only the distribution of data in one direction from the data distributor to the user, but also a communication path from the user to the data distributor. The conventional transmission system is not provided with such a function.

Also, in the conventional simultaneous communication or broadcast system from a data distributor to many users, all users always receive, use, or view the same information. There is no personal identification information of the system users, therefore it is not possible to distribute data from the data distributor to only specific users.

Further, where data is transmitted or a conversation is conducted by using a public telephone line, dedicated line, etc., in order to prevent the leakage of the transmitted information or maintain the reliability of the information against attack (interference) with respect to the transmitted information, plain text data is encoded (scrambled) and then transmitted, and the encoded data is decoded (descrambled) at the destination of reception. As a typical encoding system, a common key encoding system and a public key system have been known.

The common key encoding system is also referred to as the symmetrical encoding system. An algorithm private type and an algorithm public type have been known. As a typical algorithm public type, the DES (data encryption standard) has been known.

In the public key system, since an enormous amount of calculation is necessary for deriving the generated key from an inspection key, the generated key is not substantially decoded, therefore it is an encoding system wherein the encoding key can be made public and is referred to also as the asymmetrical key encoding system.

The encoding system is determined in accordance with the type of the line system through which the transmission data is transmitted, the degree of secrecy (secret) of the transmitted data, the amount of transmitted data, etc.

In data transmission using a dedicated line, the degree of leakage of the information and the attack of the transmitted data is low. But when data is transmitted by using a public telephone line, the degree of the leakage of information and the degree of attack becomes high. Further, the transmission of data using a satellite broadcasting line can be received by many unspecified apparatuses, therefore the degree of leakage of information becomes even higher.

FIG. 1 is a schematic structural view of an example of an encoded data transmitting apparatus for encoding the data on the transmission line by a common key encoding system.

In the encoded data transmitting apparatus of FIG. 1, reference numeral 101 denotes a transmitting apparatus (transmitter), reference numeral 102 denotes a receiving apparatus (receiver), 103 denotes a tapping apparatus (tapper), reference numeral 104 denotes a data transmission line, reference numeral 105 denotes data which should be transmitted, reference numeral 106 denotes an encoding unit provided in the transmitting apparatus 101, reference numeral 107 denotes an encoding key (encoding session key) used for the encoding in the encoding unit 106, reference numeral 108 denotes a decoding key (decoding session key), reference numeral 109 denotes a decoder for decoding the encoded data received from the data transmission line 104 using the decoding key, and reference numeral 110 denotes the data after decoding.

The transmitting apparatus 101, when transmitting the data 105 onto the transmission line 104, has the encoding unit 106 encode the data 105 by using the encoding key 107 and transmits the encoded data to the receiving apparatus 102 via the transmission line 104.

The receiving apparatus 102, when receiving the encoded data from the transmission line 104 (encoded data), has the decoder 109 decode the received encoded data by using the decoding key 108 corresponding to the encoding key 107 so as to obtain an intended decoded (deciphered) data 110.

In this example, even if the tapping apparatus 103 receives the encoded data from the transmission line 104 in the same way as the receiving apparatus 102, there is no decoding key 108, so it is difficult to correctly decode this. Namely, the tapping apparatus 108 ends up handling encoded (scrambled) data as is, therefore, in actuality, the information is prevented from being leaked to the tapping apparatus 103 side.

In a principal encoding system of the common key encoding system in this example, generally the encoding key 107 and the decoding key 108 have the same bit train.

Recently, broadcasters have been making satellite broadcasts for providing TV programs to only specific contractors. The transmission system used for the satellite broadcast can transmit a large amount of data (information) such as a video and audio in a short time. Further, a transmission system using a satellite can transmit a large amount of information in a short time and therefore is not limited to broadcasts—it has been widely utilized for the transmission of data such as computer data.

In transmission using a satellite, however, unlike a one-to-one communication system such as a telephone line and dedicated line, many unspecified receivers can easily receive the data (by receiving apparatuses), so it is easy to be tapped by nature. As a result, there is a high possibility that for example a pay satellite broadcast will be tapped. Therefore, it has been proposed too to also encode the video data and audio data of a TV broadcast for transmission.

In actual transmission, the encoding is not carried out for all data, but the data which should be encoded is encoded and transmitted onto the transmission line in accordance with the content of the data to be transmitted in the transmitting apparatus (for example, whether it is pay data or not). The receiver decodes all or part of the encoded data to determine whether or not the all or partially decoded data is necessary for it at the present by the information obtained as a result of this.

In the encoded data transmitting apparatus for transmitting encoded data in this way, it is necessary for the transmission side and reception side to hold the encoding key and decoding key in advance in secret so as not to be known to third parties.

As in the conventional method where the transmission side holds the encoding key and the reception side holds the decoding key, for example, when encoding and transmitting video data etc. by using for example a satellite transmission line, consideration may be made of the method of the transmitter sending the receiver a piece of paper, an IC card, etc. on which the decoding key is recorded by the mail or another method, the method of transmitting the encoding key and the decoding key through the same transmission line as the satellite transmission line for sending the video data (satellite transmission line), and further a method combining them.

In the conventional method of management of an encoding key and decoding key, there are the following problems.

A first problem is related to how the transmitter gets to hold the encoding key or how the receiver gets to hold the decoding key or.

As explained above, as the method for having the encoding key held by the transmitter and having the decoding key held by the receiver, the method for sending an object such as the paper and IC card on which the decoding key is recorded from the transmitter to the receiver by the method of mail, etc., the method of sending the same by the satellite transmission line, and further the method combining them, are general.

(1) In the method of sending an object on which the decoding key is recorded through the mail etc., due to the trouble of the procedure thereof, it is not easy to change the encoding key and the decoding key. This means that a large amount of data encoded using the same key will be transmitted onto the transmission line and that, since a large amount of information will be given to the tapper, the safety with respect to the deciphering will be low.

(2) In the method of sending the decoding key by using a satellite transmission line, the data on the satellite transmission line will be received by many unspecified persons having the antennas and other equipment irrespective of whether or not the transmitter desires these persons as the receivers. Thus, there is a possibility that the decoding key will be learned by persons other than the receivers expected by the transmitter and therefore there is problem that the safety of the transmission cannot be held.

(3) In the method combining the above two methods, that is, the method of preparing the decoding key from information recorded on an object sent by mail etc. and information transmitted through a satellite transmission line, the drawbacks of the two methods are compensated and the safeness of the transmission method becomes higher to a certain extent. However, the problem that information for a decoding key sent through the mail etc. cannot be easily changed due to the troublesomeness of the procedures and the problem that the information for a decoding key transmitted through a satellite transmission line ends up being received by a large number of unspecified persons not desired by the transmitter remain.

A second problem relates to how to decide whether or not the transmitter has encoded the data or how the receiver should decode the received data.

As mentioned above, in the methods which are used in general at the present, the transmitting apparatus views the contents of the data, encodes the data which must be encoded, and transmits it onto the transmission line. The receiving apparatus decides whether or not this data is necessary for it by the information obtained by decoding all or part of the encoded data received from the transmission line. In this method, however, the transmitting apparatus has to perform processing for learning the contents of the data for determining whether or not the data must be encoded. Further, the receiving apparatus has to determine whether the received encoded data is required by it or not, that is, it has to perform processing for decoding all or part of the encoded data for deciding whether or not the data is addressed to it. For this reason, while it is necessary to perform the transmission at a higher speed and perform the processing in the apparatuses, with the hardware configuration heretofore, such a demand could not be satisfied.

DISCLOSURE OF THE INVENTION

An object of the present invention is to enable effective encoding of transmitted data at the transmitting side and effective decoding of the encoded data transmitted at the receiving side.

Another object of the present invention is to enable transmission of digital data by a wireless method without causing errors in transmission.

Still another object of the present invention is to enable transmission of digital data by a wireless method from a transmitting apparatus to just specific clients.

According to the present invention, there is provided a data transmitting apparatus connected to a first transmission system and a second transmission system, the data transmitting apparatus having a key transmitting means for transmitting through the second transmission system decoding key information for decoding encoded data sent through the first transmission system, generating means for adding first transmission control information to the data to be encoded and transmitted so as to generate transmitted data, encoding means for generating encoded data from the transmitted data based on encoding key information corresponding to the decoding key information, and data transmitting means for transmitting to the first transmission system the encoded data generated by the encoding means.

Preferably, the communication capacity per unit time of the first transmission system is larger than the communication capacity per unit time of the second transmission system. Specifically, the first transmission system includes a satellite transmission line and the second transmission system includes a cable transmission line.

Preferably, the key transmitting means transmits destination information of the transmitted data along with the decoding key information through the second transmission system.

More preferably, the key transmitting means transmits the same decoding key information and destination information to a plurality of receiving apparatuses connected to the first transmission line and the second transmission line.

Still more preferably, the encoding means generates encoded data from the transmitted data based on the encoding key information and the destination information of the transmitted data.

Preferably, further provision is made of a key encoding means for encoding the work key information to generate decoding key information.

Preferably, the encoding means generates encoded data from the transmitted data based on the work key information and the destination information of the transmitted data.

Preferably, the first transmission control information includes the destination information of the transmitted data.

Preferably, the first transmission control information includes an address defined by an Internet protocol as the destination information.

Preferably, the encoding means encodes the transmitted data including the first transmission control information.

Preferably, the encoding means adds to the transmitted data second transmission control information including the same destination information as the destination information included in the first transmission control information to generate the encoded data.

Preferably, the encoding means adds a CRC check bit to generate the encoded data.

Preferably, the second transmission control information includes information indicating the presence of coding of the data to be transmitted.

Preferably, the second transmission control information includes information for distinguishing whether the data to be transmitted is information responding to a request from a receiving apparatus or whether it is control information for operating the communications system including the data transmitting apparatus.

Further, according to the present invention, there is provided a data transmitting apparatus connected to a first transmission system and a second transmission system, the data transmitting apparatus provided with a key receiving means for receiving from the second transmission system encoding key information for encoding encoded data transmitted through the first transmission system, data generating means for adding control information to the data to be encoded and transmitted to generate transmitted data, encoding means for generating encoded data from the transmitted data based on the encoding key information, and data transmitting means for transmitting through the first transmission system the encoded data generated by the encoding means.

Preferably, the encoding means is provided with key decoding means for decoding the encoding key information to generate work key information and uses the work key information decoded by the key decoding means to generate encoded data.

More preferably, the encoding means generates encoded data based on the work key information and the destination information of the encoded data.

Further, according to the present invention, there is provided a data transmission method for transmitting data using a first transmission system and a second transmission system, the data transmission method comprising a key transmitting step for transmitting through the second transmission system decoding key information for decoding encoded data transmitted through the first transmission system, a data generating step for adding first transmission control information to the data to be encoded and transmitted to generate transmitted data, an encoding step for generating encoded data from the generate transmitted data based on encoding key information corresponding to the decoding key information, and a data transmitting step for transmitting the encoded data generated by the encoding step through the first transmission system.

Preferably, the key transmitting step transmits destination information of the transmitted data along with the decoding key information through the second transmission system.

More preferably, the key transmitting step transmits the same decoding key information and destination information to a plurality of receiving apparatuses connected to the first transmission line and the second transmission line.

Still more preferably, the encoding step generates encoded data from the transmitted data based on the encoding key information and the destination information of the transmitted data.

Preferably, further provision is made of a key encoding step for encoding the work key information to generate decoding key information.

Preferably the encoding step generates encoded data from the transmitted data based on the work key information and the destination information of the transmitted data.

Preferably, the first transmission control information includes the destination information of the transmitted data.

Preferably, the first transmission control information includes an address defined by an Internet protocol as the destination information.

Preferably, the encoding step encodes the transmitted data including the first transmission control information.

Preferably, the encoding step adds to the transmitted data second transmission control information including the same destination information as the destination information included in the first transmission control information to generate the encoded data.

Preferably, the encoding step adds a CRC check bit to generate the encoded data.

Preferably, the second transmission control information includes information indicating the presence of coding of the data to be transmitted.

Preferably, the second transmission control information includes information for distinguishing whether the data to be transmitted is information responding to a request from a receiving apparatus or whether it is control information for operating the communications system including the data transmitting apparatus.

Further, according to the present invention, there is provided a data transmission method in a transmitting apparatus connected to a first transmission system and a second transmission system, the data transmission method comprising a key receiving step for receiving from the second transmission system encoding key information for encoding encoded data transmitted through the first transmission system, data generating step for adding control information to the data to be encoded and transmitted to generate transmitted data, an encoding step for generating encoded data from the transmitted data based on the encoding key information, and a data transmitting step for transmitting through the first transmission system the encoded data generated by the encoding step.

Preferably, the encoding step is provided with a key decoding step for decoding the encoding key information to generate work key information and uses the work key information decoded by the key decoding step to generate encoded data.

More preferably, the encoding step generates encoded data based on the work key information and the destination information of the encoded data.

Further, according to the present invention, there is provided a data receiving apparatus connected to a first transmission system over which encoded data is transmitted and a second transmission system over which key information is transmitted, the data receiving apparatus provided with key receiving means for receiving from the second transmission system decoding key information for decoding encoded data received from the first transmission system, a data receiving means for receiving the decoded data from the first transmission system, a data restoring means for deleting first transmission control information from the encoded data, and a decoding means for decoding the encoded data from which the first transmission control information was deleted based on the decoding key information to generate decoded data.

Preferably, the communication capacity per unit time of the first transmission system is larger than the communication capacity per unit time of the second transmission system. Specifically, the first transmission system includes a satellite transmission line and the second transmission system includes a cable transmission line.

Preferably, the key receiving means receives destination information of the encoded data along with the decoding key information from the second transmission system.

More preferably, a plurality of receiving apparatuses are connected to the first transmission system, and the key receiving means receives the same decoding key information and destination information as other receiving apparatuses connected to the first transmission line and the second transmission line.

Preferably, the decoding means generates decoded data from the received data based on the decoding key information and the destination information of the encoded data.

Preferably, the decoding means is provided with key decoding means for decoding the decoding key information to generate work key information and uses the work key information generated by the key decoding means to decode the encoded data.

Preferably, the decoding means decodes the encoded data based on the work key information and the destination information of the encoded data.

More preferably, the first transmission control information includes the destination information of the encoded data.

Still more preferably, the first transmission control information includes an address defined by an Internet protocol as the destination information.

Specifically, the decoding means decodes the encoded data which was encoded including the first transmission control information.

Preferably, further provision is made of a judgement means for judging if the encoded data is directed to itself based on the second transmission control information including the same destination information as the destination information included in the first transmission control information of the encoded data.

Preferably, the judgement means judges if the encoded data is directed to itself and checks to the CRC check bit added to the encoded data to check for errors.

More preferably, the judgement means judges if the encoded data is directed to itself and decides whether to decode or not based on the information indicating the presence of encoding included in the second transmission control information.

Preferably, the second transmission control information includes information for distinguishing whether the received data is information responding to a request from its own receiving apparatus or whether it is control information for operating the communications system including the receiving apparatus.

Further, according to the present invention, there is provided a data receiving apparatus connected to a first transmission system and a second transmission system, the data receiving apparatus provided with a key transmitting means for transmitting through the second transmission system encoding key information for preparing encoded data received from the first transmission system, data receiving means for receiving the encoded data encoded based on the encoding key information from the first transmission system, data restoring means for deleting the first transmission control information from the encoded data, and a decoding means for decoding the encoded data based on decoding key information corresponding to the encoding key information.

Preferably, further provision is made of a key encoding means for encoding work key information to generate encoding key information.

More preferably, the decoding means is provided with a decoding key generating means for generating a decoding key based on the work key information and the destination information of the encoded data and decodes the encoded data based on the decoding key generated by the decoding key generating means.

Further, according to the present invention, there is provided a data receiving method in a receiving apparatus connected to a first transmission system and a second transmission system, the data receiving method comprising a key receiving step for receiving from the second transmission system decoding key information for decoding encoded data received from the first transmission system, a data receiving step for receiving the decoded data from the first transmission system, a data restoring step for deleting first transmission control information from the encoded data, and a decoding step for decoding the encoded data from which the first transmission control information was deleted based on the decoding key information to generate decoded data.

Preferably, the key receiving step receives the same decoding key information and destination information as other receiving apparatuses connected to the first transmission system and the second transmission system.

More preferably, the decoding step generates decoded data from the encoded data based on the decoding key information and the destination information of the encoded data.

More preferably, the decoding step is provided with key decoding step for decoding the decoding key information to generate work key information and uses the work key information generated by the key decoding step to decode the encoded data.

Preferably, the decoding step decodes the encoded data based on the work key information and the destination information of the encoded data.

Preferably, the first transmission control information includes the destination information of the encoded data.

More preferably, the first transmission control information includes an address defined by an Internet protocol as the destination information.

Preferably, the decoding step decodes the encoded data which was encoded including the first transmission control information.

Preferably, further provision is made of a judgement step for judging if the encoded data is directed to itself based on the second transmission control information including the same destination information as the destination information included in the first transmission control information of the encoded data.

Preferably, the judgement step judges if the encoded data is directed to itself and checks to the CRC check bit added to the encoded data to check for errors.

More preferably, the judgement step judges if the encoded data is directed to itself and decides whether to decode or not based on the information indicating the presence of encoding included in the second transmission control information.

Preferably, the second transmission control information includes information for distinguishing whether the received data is information responding to a request from its own receiving apparatus or whether it is control information for operating the communications system including the receiving apparatus.

Further, according to the present invention, there is provided a data receiving method in a receiving apparatus connected to a first transmission system and a second transmission system, the data receiving method comprising a key transmitting step for transmitting through the second transmission system encoding key information for preparing encoded data received from the first transmission system, a data receiving step for receiving the encoded data encoded based on the encoding key information from the first transmission system, a data restoring step for deleting the first transmission control information from the encoded data, and a decoding step for decoding the encoded data based on decoding key information corresponding to the encoding key information.

Preferably, further provision is made of a key encoding step for encoding work key information to generate encoding key information.

Preferably, the decoding step is provided with a decoding key generating step for generating decoding key information based on the work key information and the destination information of the encoded data and decodes the encoded data based on the decoding key generated by the decoding key generating step.

Further, according to the present invention, there is provided a data transmission apparatus having a first transmission system and a second transmission system, the data transmission apparatus provided with:

a transmitting apparatus having a key transmitting means for transmitting through the second transmission system decoding key information for decoding the encoded data transmitted through the first transmission system, data generating means for generating transmitted data added with first transmission control information from the data to be encoded and transmitted, encoding means for generating encoded data from the transmitted data based on encoding key information corresponding to the decoding key information, and data transmitting means for transmitting through the first transmission system the encoded data generated by the encoding means and a receiving apparatus having a key receiving means for receiving from the second transmission system decoding key information for decoding the encoded data received from the first transmission system, data receiving means for receiving the encoded data from the first transmission system, data restoring means for deleting first transmission control information from the encoded data, and decoding means for decoding the encoded data based on the decoding key information.

Further, according to the present invention, there is provided a data transmission apparatus having a first transmission system and a second transmission system, the data transmission apparatus provided with:

a transmitting apparatus having a key receiving means for receiving from the second transmission system encoding key information for encoding the encoded data transmitted through the first transmission system, data generating means for generating transmitted data added with control information from the data to be encoded and transmitted, encoding means for generating encoded data from the transmitted data based on encoding key information, and data transmitting means for transmitting through the first transmission system the encoded data generated by the encoding means and a receiving apparatus having a key transmitting means for transmitting through the second transmission system encoding key information for preparing the encoded data received from the first transmission system, data receiving means for receiving the encoded data encoded based on the encoding key information from the first transmission system, data restoring means for deleting first transmission control information from the encoded data, and decoding means for decoding the encoded data based on decoding key information corresponding to the encoding key information.

Further, according to the present invention there is provided a data transmission method using a transmission apparatus having a first transmission system and a second transmission system, the data transmission method comprising:

a transmitting processing step having a key transmitting step for transmitting through the second transmission system decoding key information for decoding the encoded data transmitted through the first transmission system, a data generating step for generating transmitted data added with first transmission control information from the data to be encoded and transmitted, an encoding step for generating encoded data from the transmitted data based on encoding key information corresponding to the decoding key information, and a data transmitting step for transmitting through the first transmission system the encoded data generated by the encoding step and a receiving processing step having a key receiving step for receiving from the second transmission system decoding key information for decoding the encoded data received from the first transmission system, a data receiving step for receiving the encoded data from the first transmission system, a data restoring step for deleting first transmission control information from the encoded data, and a decoding step for decoding the encoded data based on the decoding key information.

Further, according to the present invention, there is provided a data transmission method for transmission of data using a transmission apparatus having a first transmission system and a second transmission system, the data transmission method comprising:

a transmitting processing step having a key receiving step for receiving from the second transmission system encoding key information for encoding the encoded data transmitted through the first transmission system, a data generating step for generating transmitted data added with control information from the data to be encoded and transmitted, an encoding step for generating encoded data from the transmitted data based on encoding key information, and a data transmitting step for transmitting through the first transmission system the encoded data generated by the encoding step and a receiving processing step having a key transmitting step for transmitting through the second transmission system encoding key information for preparing the encoded data received from the first transmission system, a data receiving step for receiving the encoded data encoded based on the encoding key information from the first transmission system, a data restoring step for deleting first transmission control information from the encoded data, and a decoding step for decoding the encoded data based on decoding key information corresponding to the encoding key information.

BEST MODE FOR CARRYING OUT THE INVENTION

The embodiments of the present invention will be explained below with reference to the drawings.

Figure 1:
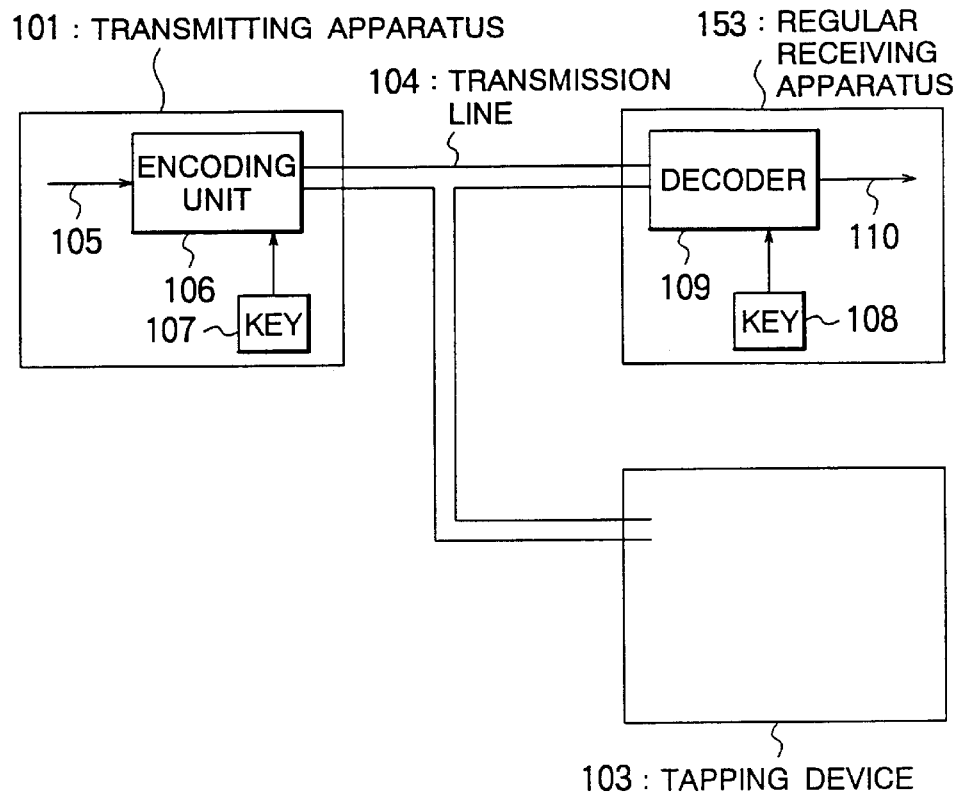
FIG. 1 is a schematic view showing an example of a transmitting method for encoding data on the transmission line.
Figure 2:
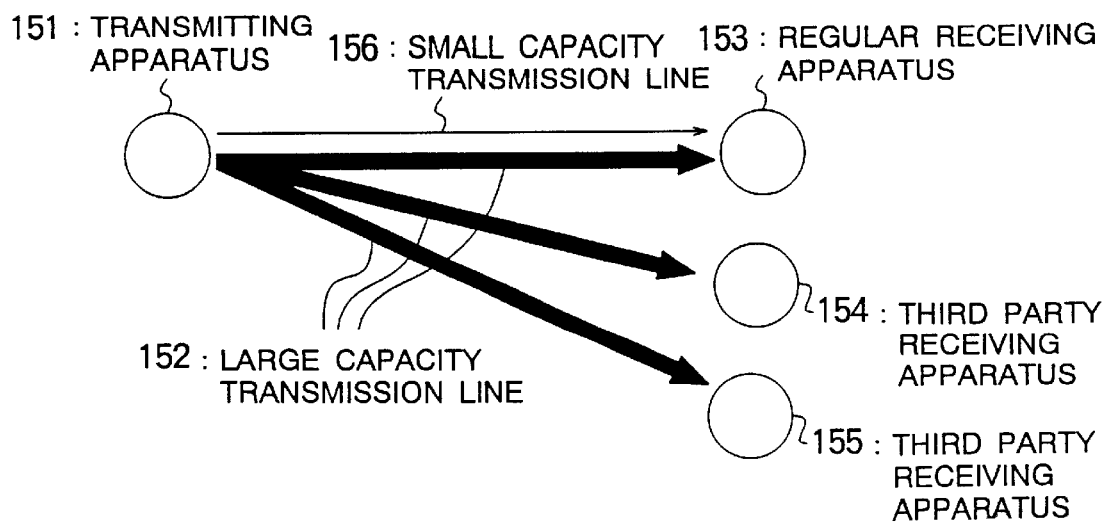
FIG. 2 is a schematic view showing the configuration of a data transmission apparatus of the present invention.

FIG. 2 is a conceptual view of the configuration of a data transmitting apparatus of the present invention. In FIG. 2, reference numeral 151 denotes a transmitting apparatus (transmitter), reference numeral 153 denotes a receiving apparatus (receiver), reference numeral 154 and reference numeral 155 denote receiving apparatuses of third persons other than the receiving apparatus 153, reference numeral 152 denotes a large capacity transmission line serving as the first transmission system, and reference numeral 156 denotes a small capacity transmission line serving as the second transmission system.

In the present invention, a large amount of data such as a TV signal, computer data, etc. is transmitted via the large capacity transmission line 152. As the large capacity transmission line 152, a satellite transmission line which transmits a large amount of data at a high speed and with a high efficiency is preferred.

Further, as the small capacity transmission line 156 which transmits the information concerning the encoding or decoding, a cable transmission line, for example, a public telephone line, ISDN (integrated services digital network) line, or dedicated line, which performs one-to-one communication with which the leakage of the information is smaller than a satellite transmission line is desirable.

The communication capacity per unit time of the large capacity transmission line 152 serving as the first transmission system is larger than the communication capacity per unit time of the small capacity transmission line 156 serving as the second transmission system.

Figure 3:
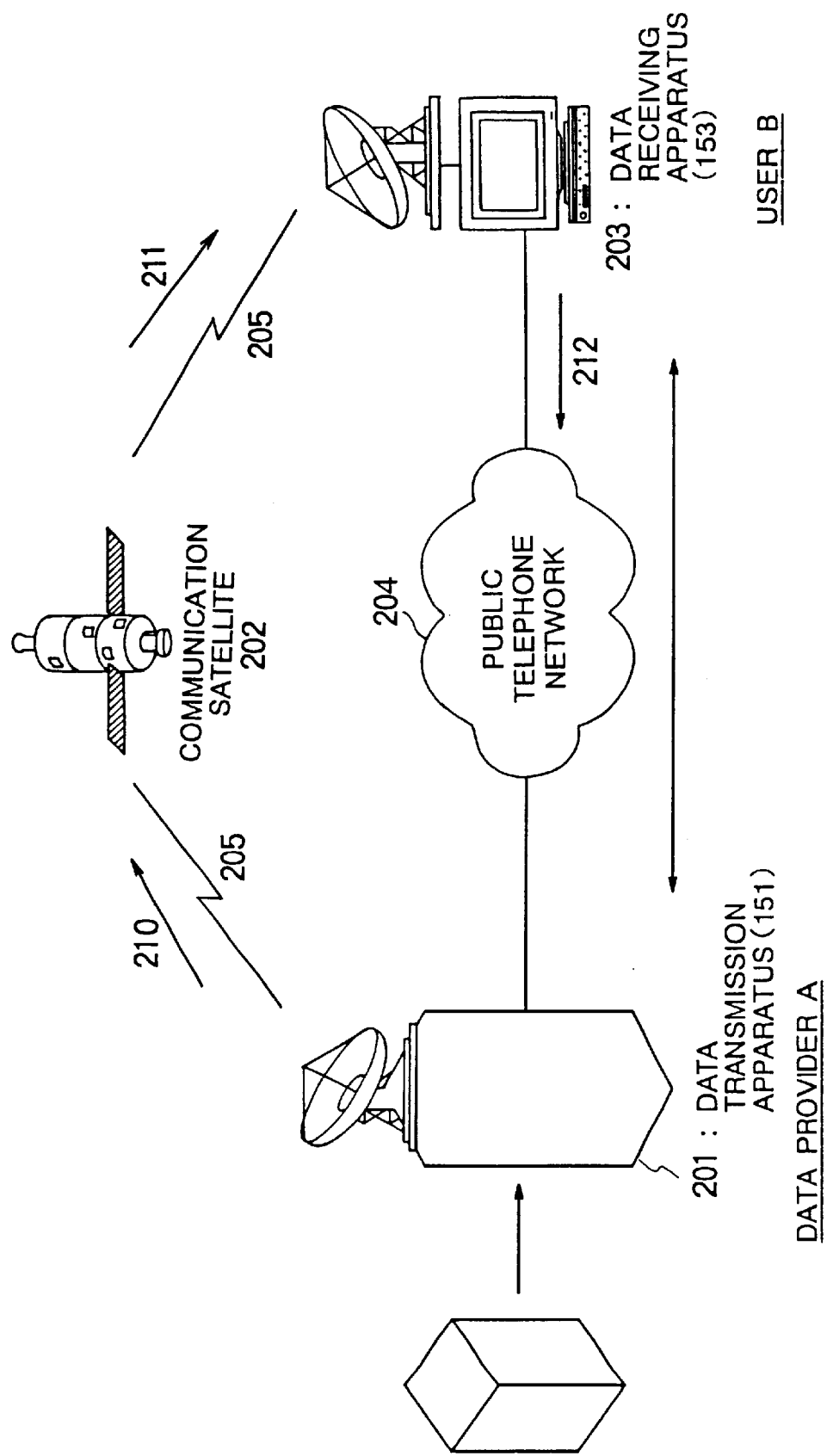
FIG. 3 is a view of an example of the configuration of a data transmission apparatus according to an embodiment of the present invention.

FIG. 3 is a schematic view of a data transmission apparatus for realizing a data service for distributing multimedia digital data (video, audio, text, etc.) FIG. 3 is a schematic view of the configuration of a transmission line using a satellite transmission line as the large capacity transmission line 152 and using a public telephone line as the small capacity transmission line 156.

A data transmitting side, that is, a data provider A, has a data transmitting apparatus 201 serving as the server, and the user B has a data receiving apparatus 203 serving as the client. Here, the data transmitting apparatus 201 and the data receiving apparatus 203 correspond to the transmitting apparatus 151 and receiving apparatus 153 in FIG. 2.

The data transmitting apparatus 201 and the data receiving apparatus 203 can communicate with each other via a public telephone line 204 capable of performing bi-directional communication and corresponding to the small capacity transmission line 156 in FIG. 2. Also, large capacity communication is possible by a wireless system from the data transmitting apparatus 201 to the data receiving apparatus 203 via a communications satellite 202 and wireless communications line 205 corresponding to the large capacity transmission line 152 in FIG. 2.

An explanation will be made next of the flow of the data in the data transmission apparatus shown in FIG. 3.

Assume that the data provider A and the user B conclude a contract for delivery of digital data in advance. At this time, assume that the data receiving apparatus 203 of the user B is provided with a function capable of receiving data from the data transmitting apparatus 201 of the data provider A.

First, the user B sends a request 212 to the data provider A via the public telephone line 204 serving as the ground communication net to the effect of wanting to receive a predetermined service provided by the data provider A. The method of sending this request 212 is not limited to the method of using a public telephone line 204 and may be determined according to the type of the data and the type of the contract with the user. For example, mail can be adopted too. Further, it is also possible for the data provider A to provide the service according to a contract concluded in advance between the data provider A and the user B without sending a request 212.

Based on the request 212 from the user B, the data transmitting apparatus 201 converts the data to be transmitted to the data receiving apparatus 203 of the user B to a predetermined format, then transmits it as the data 210 to the communications satellite 202.

The communications satellite 202 relies the data 210 received from the data transmitting apparatus 201 and transmits the data 211 toward the ground.

The data 211 transmitted from the communications satellite 202 may be received by not only the data receiving apparatus 203 owned by the user B, but by the data receiving apparatuses of all users in a condition to receive the data. The data receiving apparatus 203 receives all of the data from the communications satellite 202 and from that selects and extracts the data responding to the request 212 which it had sent out it.

Figure 4:
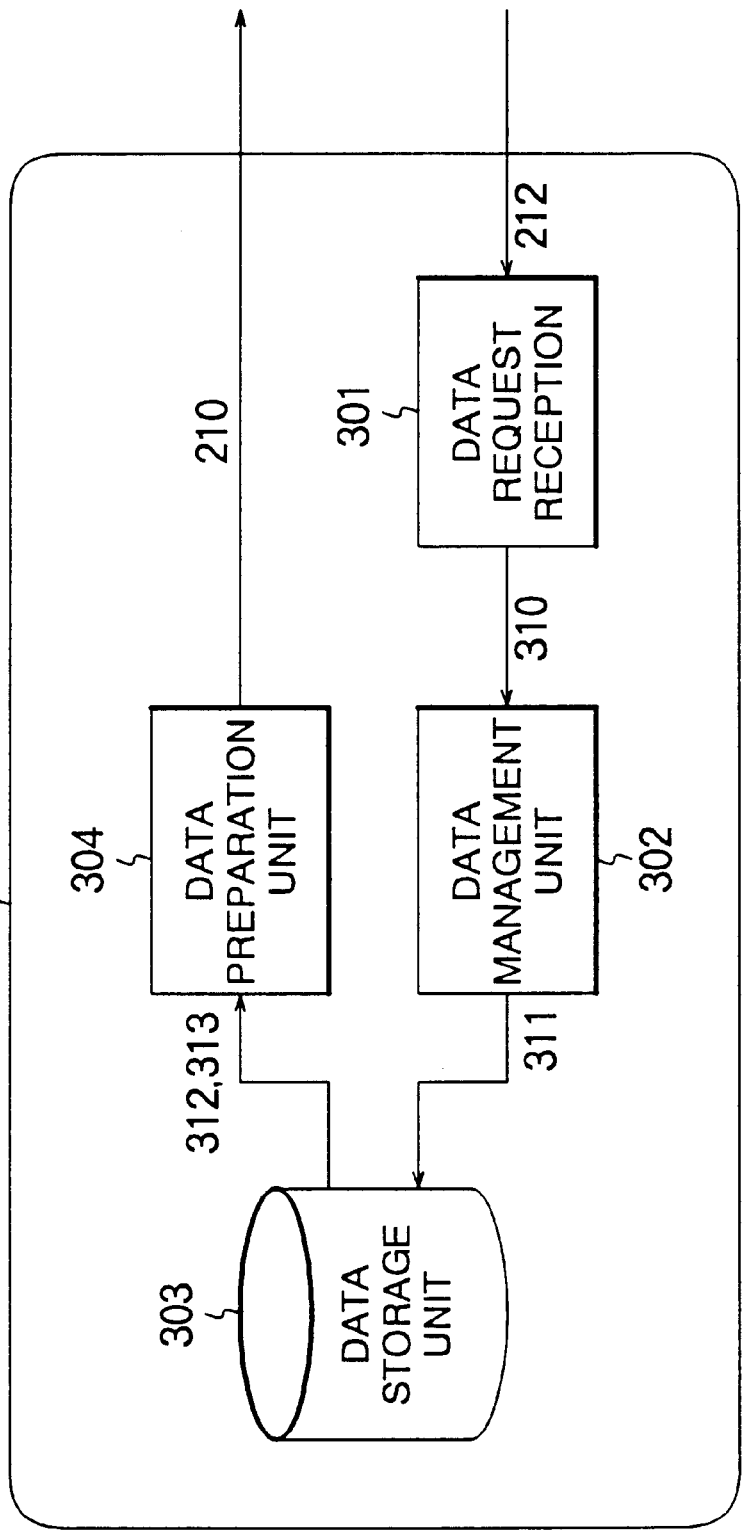
FIG. 4 is a view for explaining the configuration of a data transmitting apparatus shown in FIG. 3.

Next, an explanation will be made of the data transmitting apparatus 201 shown in FIG. 3 with reference to FIG. 4.

The request 212 from the user B transmitted to the data transmitting apparatus 201 is picked up by a data request reception unit 301 and sent to a data management unit 302 (data 310).

The data management unit 302 performs the check of whether or not the contract information of the user B and request 212 have meaning. When there is no problem, it sends a reading request 311 to a data storage unit 303. The data storage unit 303 sends for example digital data 312 in accordance with the data reading request 310 to a data preparation unit 304.

The data preparation unit 304 prepares the digital data 312 from the data storage unit 303 by, for example, conversion of the data format such as the formation of an IP (Internet protocol) packet, encoding, formation of frames of for MAC (media access control), transportation of the MPEG (Moving Picture Experts Group) 2, etc. The conversion of the data format will be explained later.

The digital data 312 from the data storage unit 303, after being prepared or subjected to the format conversion by the data preparation unit 304, is sent as the data 210 to the communications satellite 202.

Next, an explanation will be made of the data receiving apparatus 203 shown in FIG. 3 with reference to FIG. 5.

The data 211 sent via the communications satellite 202 can be received by all users capable of receiving the data and is not limited to the data receiving apparatus 203 of the user B. The data receiving apparatus 203 receives all data from the communications satellite 202 and selects and receives the data in accordance with the request 212 issued by itself among them.

Namely, the data receiving apparatus 203 receives a large number of bits of data 211 containing transmitted data in accordance with the request 212 at the data receiving unit 401. The data receiving apparatus 203 selects the data directed to itself, the data which should be received by itself, and the data which can be received by itself (this is according to contract too) from among them. This selection is carried out at the data selection unit 402 of the data receiving apparatus 203. Note that, the data receiving apparatus 203 possessed by the user B is determined in advance by the contract between the user B and the data provider A. Accordingly, the specific data directed to another user cannot be selected by using the data receiving apparatus 203 possessed by the user B.

In the data selection unit 402, the data 310 which can be received by the user B is all sent to a data decomposing unit 403. The data directed to the user B sent to the data decomposing unit 403 is decomposed or decoded and becomes the digital data 412 which is sent to a data execution unit 404.

By this, only the user B can receive the data directed to the user B requested by the user B. This completes the data service.

Note that there are cases where the reception of the requested data is instantaneously carried out and a case where it continues for a long period. Where it is data of a type that is continuously received over a long period, the reception of the data is subsequently repeated in the data receiving apparatus 203 of the user B. The situation of this varies according to the type of the data requested by the user B.

Next, a detailed explanation will be made of the conversion of the data format of the transmitted data in the data transmitting apparatus 201.

First, an explanation will be made of the basic processing of the data preparation unit 304 of the data transmitting apparatus 201 of the data provider A by referring to FIG. 6.

In the data storage unit 303 in the data transmitting apparatus 201, the digital data required by the user is saved in an unprocessed form. The data storage unit 303 notified by the data management unit 302 that a reading request 311 of the data has come from the user B simultaneously sends the requested digital data 312 and the destination information 313 of the user B to the IP packet preparation unit 501 in the data preparation unit 304. Here, the destination information 313 of the user B is the IP address necessary for the IP packet transmission. In the data transmitting apparatus according to the present embodiment, inherent IP addresses are assigned to all contracted users. The IP address possessed by the user B is not possessed by users other than the user B during the period when the user B secures this.

The digital data 312 and the IP address 313 directed to the user B sent from the data storage unit 303 are sent to the IP packet preparation unit 501. In the IP packet preparation unit 501, the IP packet 510 is prepared by using the digital data 312 sent from the data storage unit 303 and the IP address 313 for specifying the user B at that point of time. The size of this IP packet is defined by the TCP/IP (transmission control protocol/Internet protocol). When the digital data requested by the user B exceeds that size, this digital data is divided into a plurality of IP packets and transferred to the next encoding unit 502.

Figure 8:
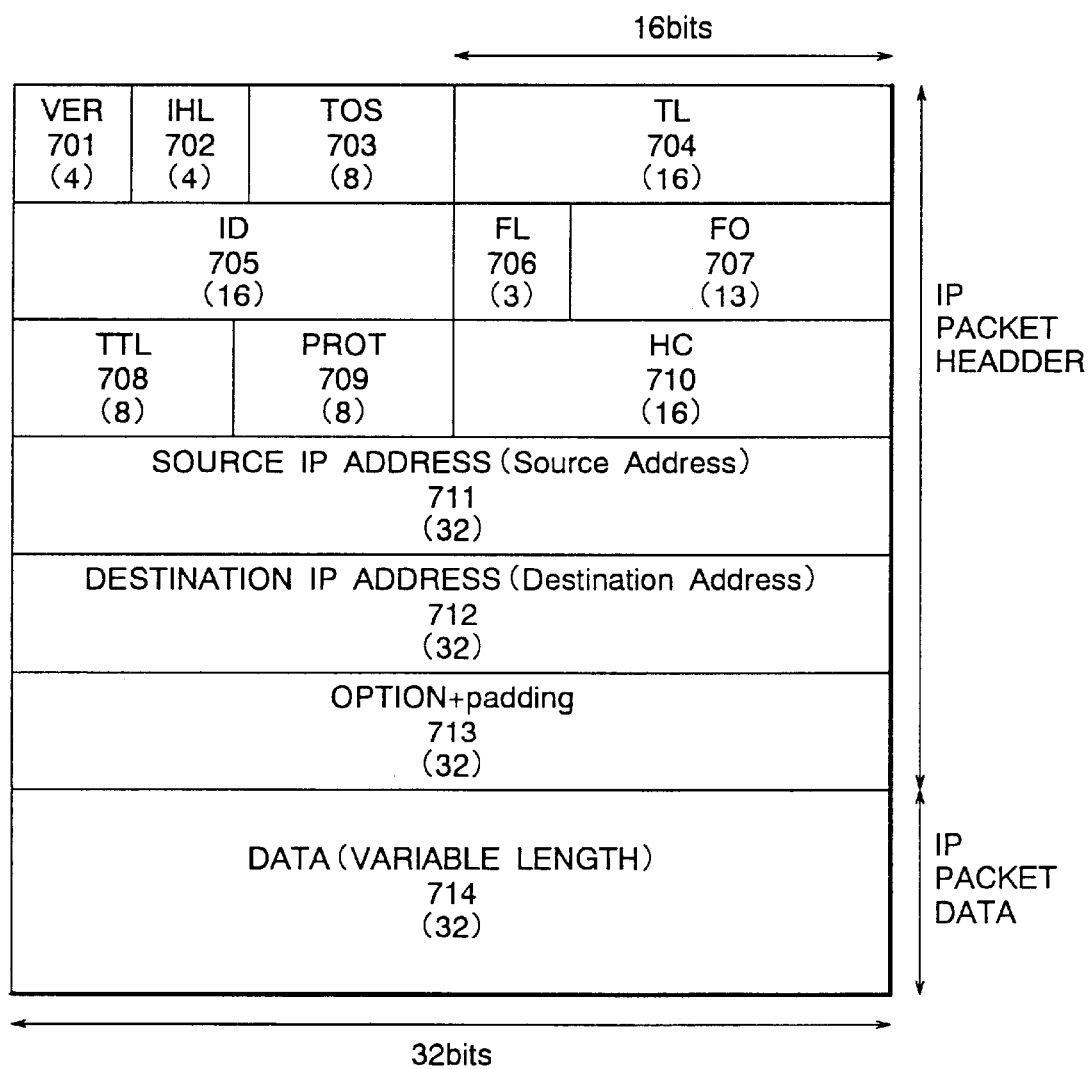
FIG. 8 is a view for explaining a format of an IP packet.

The format of the IP packet 510 used in the data transmission apparatus according to the present embodiment is shown in FIG. 8.

VER (version) 701 is comprised of 4 bits and shows the version number of the IP protocol. It is used for confirming the compatibility of the IP. For example, when the version of the IP protocol is 4, the value of the VER 701 becomes "4".

IHL (Internet header length) 702 is comprised of 4 bits and shows the size of the IP packet header in units of 4 octets (32 bits). This is used for finding the head of a data field.

TOS (type of service) 703 is comprised of 8 bits and shows the quality of service requested by the transmitted datagram.

TL (total length) 704 is comprised of 16 bits and shows the total length, including the IP packet header and IP packet data field, in units of octets (8 bits).

ID (identification) 705 is comprised of 16 bits and is the identification number for distinguishing between the datagrams from the higher level.

FL (flags) 706 is comprised of 3 bits and shows information relating to the division of a datagram (fragments). When the data is divided, this shows whether a fragment is intermediate or final.

FO (fragment offset) 707 is comprised of 13 bits and shows the position of the fragments in the original data in units of 8 octets.

TTL (Time To Live) 708 is comprised of 8 bits and shows the time (unit: seconds) at which a datagram set at the time of transmission is allowed to be present on the network. This is decremented by "1" every time the datagram passes a router. When this value becomes "0", the router discards the datagram without relaying it. This is to prevent the occurrence of excessive traffic on the network when loops occur on the network (datagrams unable to reach their destinations due to errors in the communications routing information circling around the same route) due to abnormalities in the routing.

PROT (protocol type) 709 is comprised of 8 bits and shows the protocol type code (no.) for identifying a higher protocol of the IP. For example, in the case of TCP (transmission control protocol), it becomes "6".

HC (Header Checksum) 710 is comprised of 16 bits and shows the checksum for detecting errors in the header field.

Source IP address 711 is comprised of 32 bits and shows the IP address of the terminal of the source of the IP packet. In the case of the embodiment shown in FIG. 3, the IP address of the data transmitting apparatus 201 is entered.

The destination IP address 712 is comprised of 32 bits and shows the IP address of the terminal of the destination of the IP packet. In the case of the embodiment shown in FIG. 3, the IP address of the data receiving apparatus 203 is entered.

The option and padding 713 are used when filling information other than the above information in the IP packet header.

Further, the digital data 312 from the data storage unit 303 in FIG. 3 enters in the data unit 713 in FIG. 8.

A detailed explanation of the IP protocol and packet header is given in Posutel, J. "Internet Protocol", STD 5, RFC 791, USC/Information Sciences Institute, September 1981.

Figure 6:
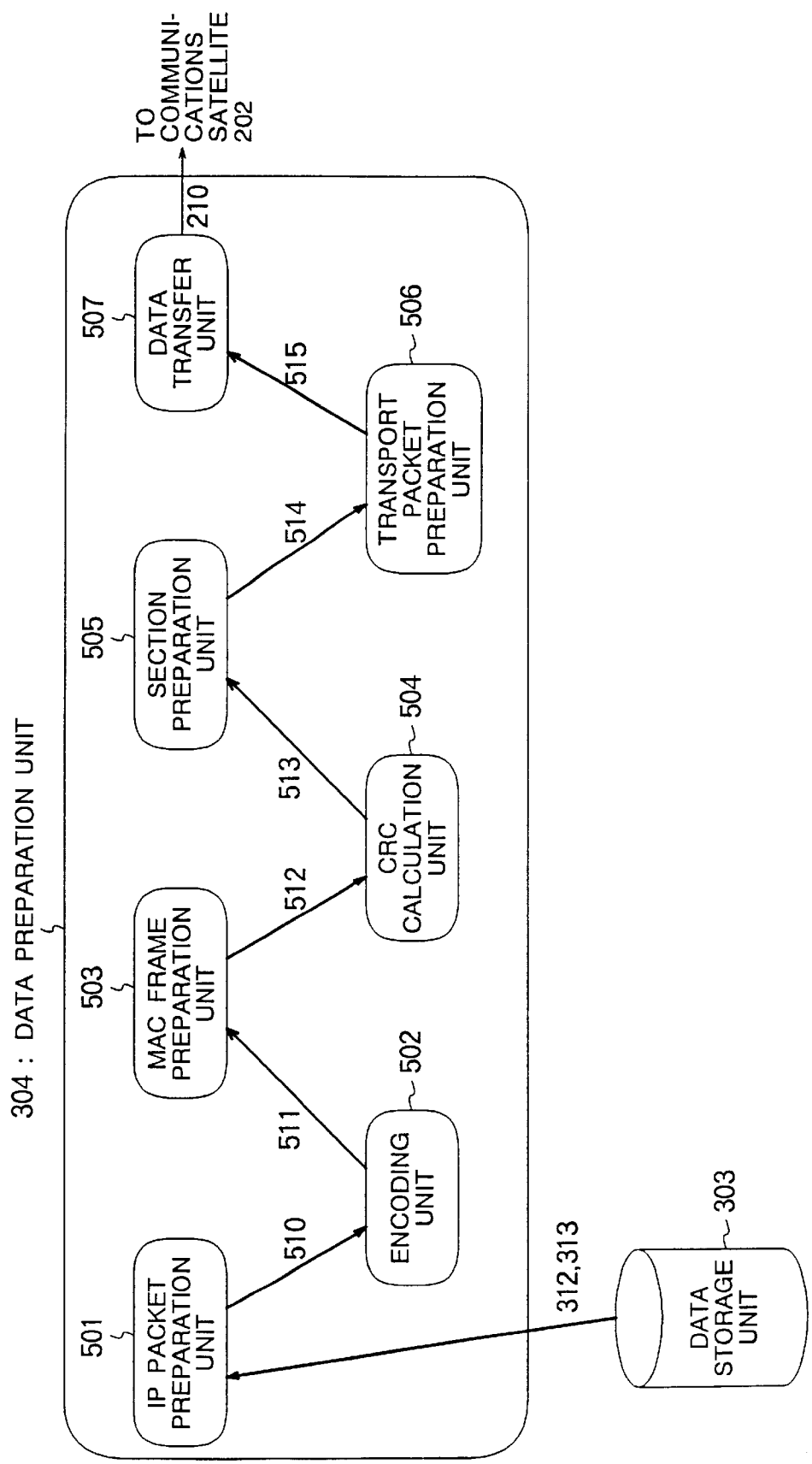
FIG. 6 is a view for explaining the configuration of a data preparing unit shown in FIG. 4.

Returning to the explanation of FIG. 6, the IP packet 510 prepared by the IP packet preparation unit 501 is transferred to the encoding unit 502.

The encoding unit 502 finds that the destination is the user B by the destination IP address 712 in the IP packet 510 and performs the encoding processing.

However, the encoding unit 502 not encoding of all of the data addressed to the user B. Depending on the type of the data 312, encoding is sometimes not performed. When encoding is not performed, the IP packet 510 is transferred directly from the IP packet preparation unit 501 to the MAC frame preparation unit 503. The encoding unit 502 will be explained in detail later.

Figure 9:
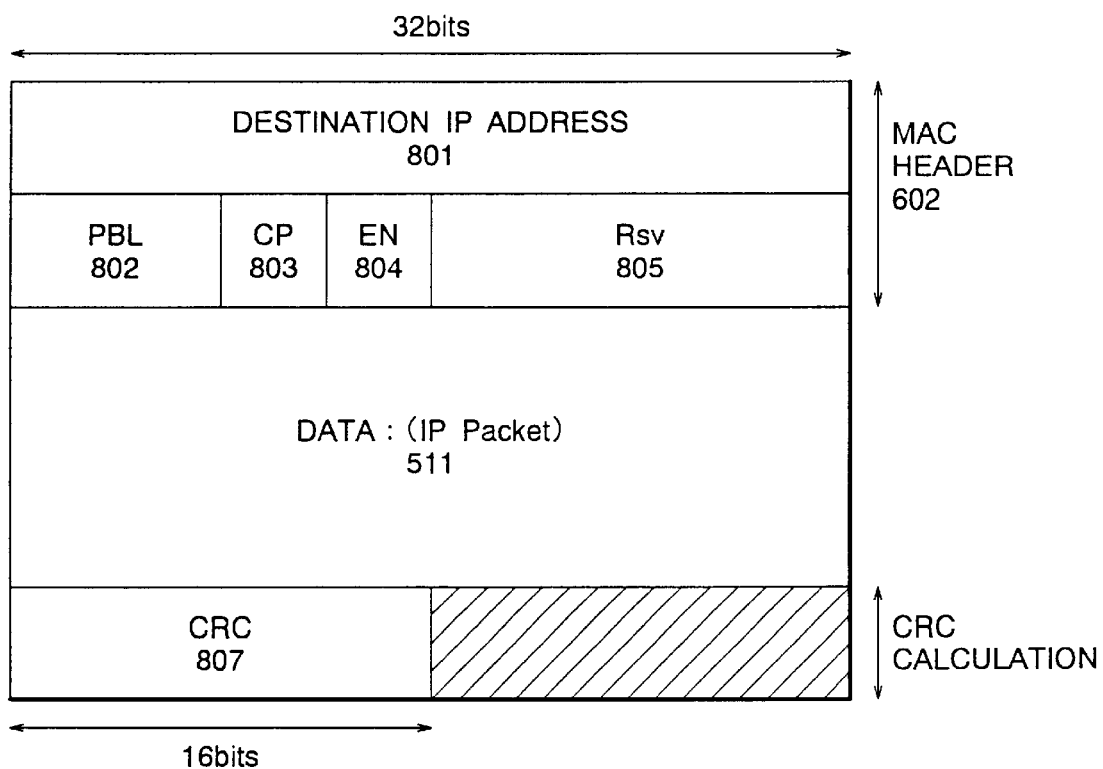
FIG. 9 is a view for explaining the format of a MAC frame.

The packet data 511 consisting of the IP packet 510 as a whole encoded by the encoding unit 502 is transferred to the MAC frame preparation unit 503. The format of a MAC frame is shown in FIG. 9. In the MAC frame preparation unit 503, the MAC header 902 shown in FIG. 9 is added to the packet data 511 addressed to the user B encoded by the encoding unit 502.

The destination IP address 801 in the MAC header 602 is comprised of 32 bits and is an IP address of the data receiving apparatus 203. Here, the destination IP address 801 of the MAC header 602 and the destination IP address in the encoded IP packet 511 are the same. In this way, the MAC header 602 is attached since the data receiving apparatus 203 can only learn of the destination IP address from the MAC header 602 at the time of receiving the data. That is, with just the encoded packet 511, the data receiving apparatus 203 cannot view the destination address until decoding the encoded IP packet 511 as a whole, so cannot determine if the packet is addressed to itself. Accordingly, in order for the data receiving apparatus 203 to learn if the IP packet is addressed to itself before decoding the received IP packet, it is necessary for the destination IP address 801 to be set in the header of the MAC frame. This destination IP address 801 is directly transferred from the IP packet preparation unit 501 to the MAC frame preparation unit 503.

Further, the PBL (padding byte length) 802 in the MAC header 602 shown in FIG. 9 is the padding byte length, that is, the length of the invalid data filled in for adjusting the size at the time of encoding. This is required for the user receiving the encoded IP packet to find the correct data length.

The CP (control packet) 803 is a bit enabling a user to identify if the necessary digital data or the control data necessary for system operation is contained. Normally, the CP 803 of a MAC frame 512 to be fetched by the user at the time of a request shows that not control data, but digital data is contained.

EN (encryption) 804 is a control bit for showing if the IP packet has been encoded by the encoding unit 502. By using this bit information, the user decides whether to decode the received MAC frame 512.

In the MAC frame preparation unit 503 of FIG. 6, the above control bit is added to an encoded (sometimes not encoded) IP packet 510.

The MAC frame 512 prepared by the MAC frame preparation unit 503 of FIG. 6 is transferred to the CRC calculation unit 504. The CRC calculation unit 504 calculates the CRC (cyclic redundancy checking) of all bytes of the sent MAC frame 512. In the present embodiment, the CRC has 16 bits. By performing the calculation of the CRC in this way, the data receiving apparatus 203 can check if the received MAC frame is correctly transmitted from the communications satellite 202. The CRC 806 of 16 bits generated in the CRC calculation unit 504 is added to the end of the MAC frame 512 as shown in FIG. 7 and FIG. 9.

The MAC frame 513 added with the CRC 806 is transferred to the section preparation unit 505 and converted to the section defined by the MPEG2. As shown in FIG. 7, the MAC frame 513 is added immediately after the section header (SecHd). The format of the section header 603 is shown in FIG. 10.

Figure 10:
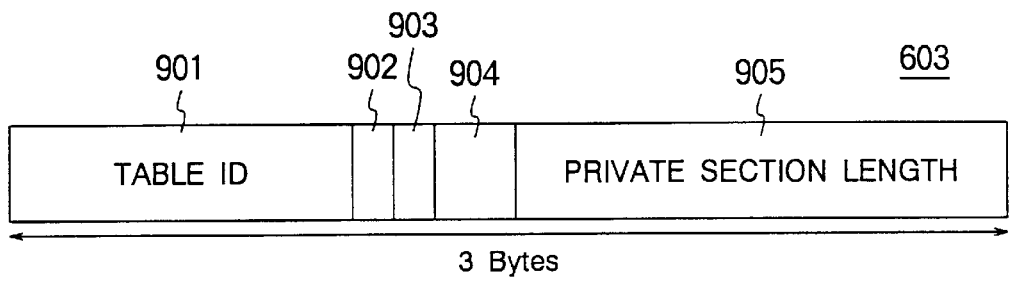
FIG. 10 is a view for explaining the format of a section header.

The format of the section header 603 shown in FIG. 10 is defined by the MPEG2 and has a table ID 901, a section syntax indicator 902, a private indicator 903, a reserved 904, and a private section length 905. Here, the data length of the MAC frame 513 is in the private section length 905. The section 514 prepared at the section preparation unit 505 shown in FIG. 6 is transferred to the transport packet preparation unit 506. In the transport packet preparation unit 506, the transferred section format data is divided into the transport packets 515 and transferred to the next data transfer unit 507.

Figure 7:
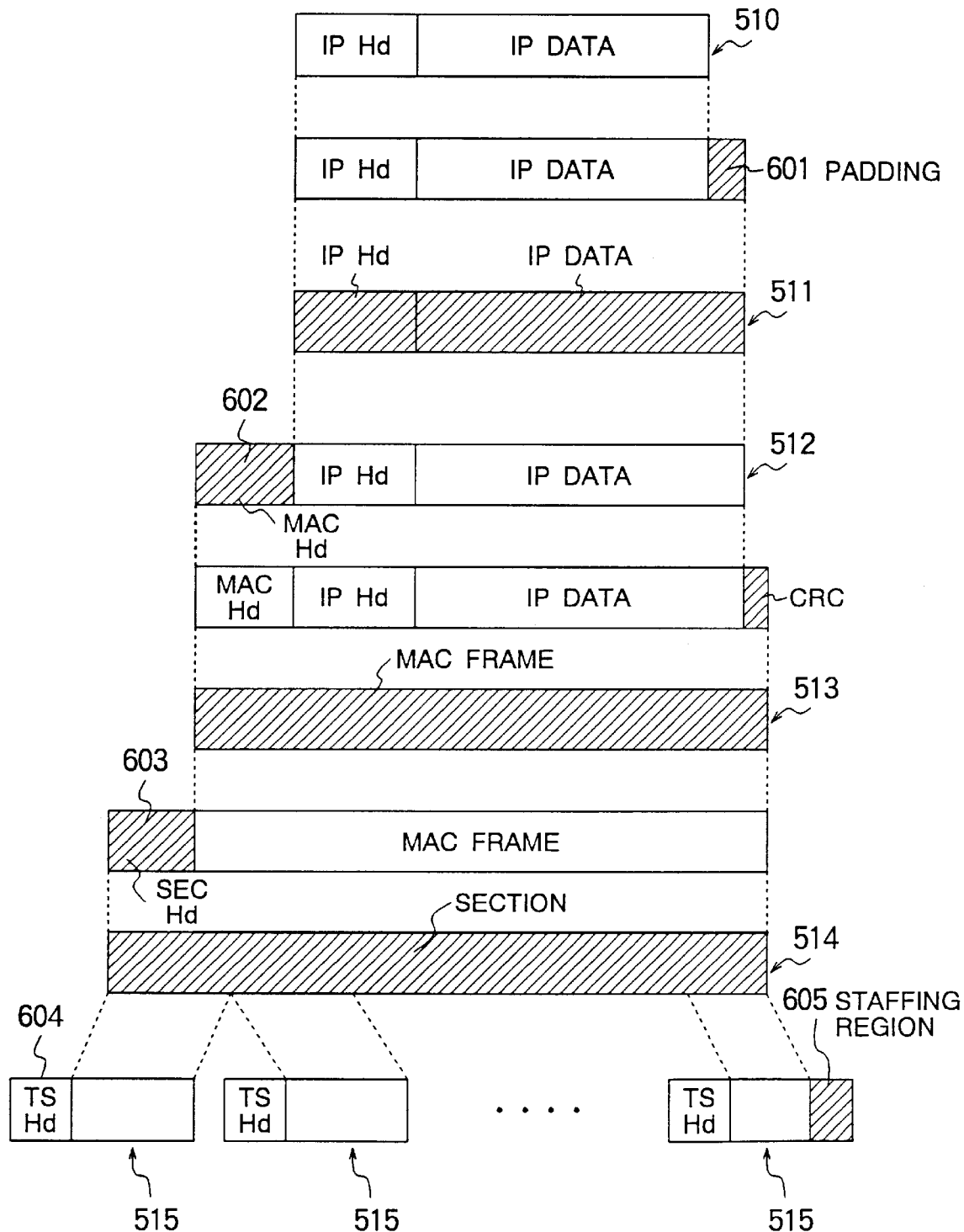
FIG. 7 is a view for explaining the processing in the data transmitting apparatus and data receiving apparatus.
Figure 11:
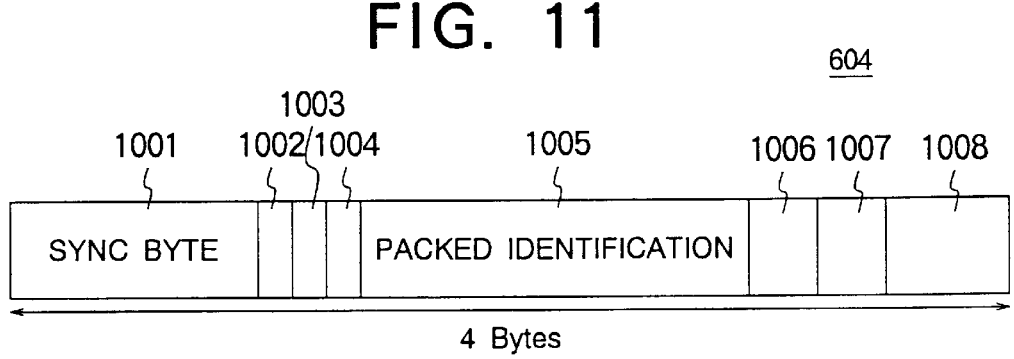
FIG. 11 is a view for explaining a packet header of a transport packet.

The format of the packet header (TSHd) 604 of the transport packet 515 shown in FIG. 7 is shown in FIG. 11. The header format of the transport packet 515 is defined by the MPEG2.

The SYNC byte 1001 is a 8 bit synchronization signal for detecting the head of a transport packet.

The error indicator 1002 is comprised of 1 bit and shows the presence of bit errors in a packet.

The payload unit start indicator 1003 is comprised of 1 bit and shows that a new PES packet has started from a payload (actual packet data) of a transport packet.

The transport packet priority 1004 is comprised of 1 bit and shows the degree of importance of the packet.

The PID (packet identification) 1005 is information for identifying the stream of 13 bits and shows the attributes of the individual streams of the packet.

The scramble control 1006 is comprised of 2 bits and shows the presence and type of the scrambling of the payload of the packet.

The adaptation field control 1007 is comprised of 2 bits and shows the presence of an adaptation field and the presence of a payload in the packet.

The continuity counter 1008 is comprised of 4 bits and is information for detecting if part of the packet having the same PID 1005 has been discarded in the interim by the continuity of the 4 bit cyclic count information.

Further, the size of a transport packet 515 is defined as 188 bytes, so in general it is necessary to divide one section 514 into a plurality of transport packets 515.

Here, usually, one section does not always have a length of a whole multiple of 184 bytes (byte number obtained by subtracting 4 bytes of the header length from 188 bytes), therefore, when dividing one section 514 into a plurality of transport packets 515, as shown in FIG. 3, data filling referred to as stuffing is carried out to form a stuffing region 605. Namely, where one section 514 which is not a multiple of 184 bytes is divided into a plurality of transport packets 515, a stuffing region 605 in which all bits "1" are stuffed is formed in the remaining data area of the last transport packet 515.

The section 514 divided into a plurality of transport packets 515 in this way is transferred to the data transmitting unit 507, passes through a data processing unit such as a multiplexer, and then transmitted to the communications satellite 202 and broadcasted.

The broadcasted multimedia data for the user B is received by the data receiving apparatus 203 of the user B and subjected to the reverse processing shown in FIG. 6 by the data decomposing unit 403. The finally requested multimedia data is delivered into the hands of the user B.

Figure 5:
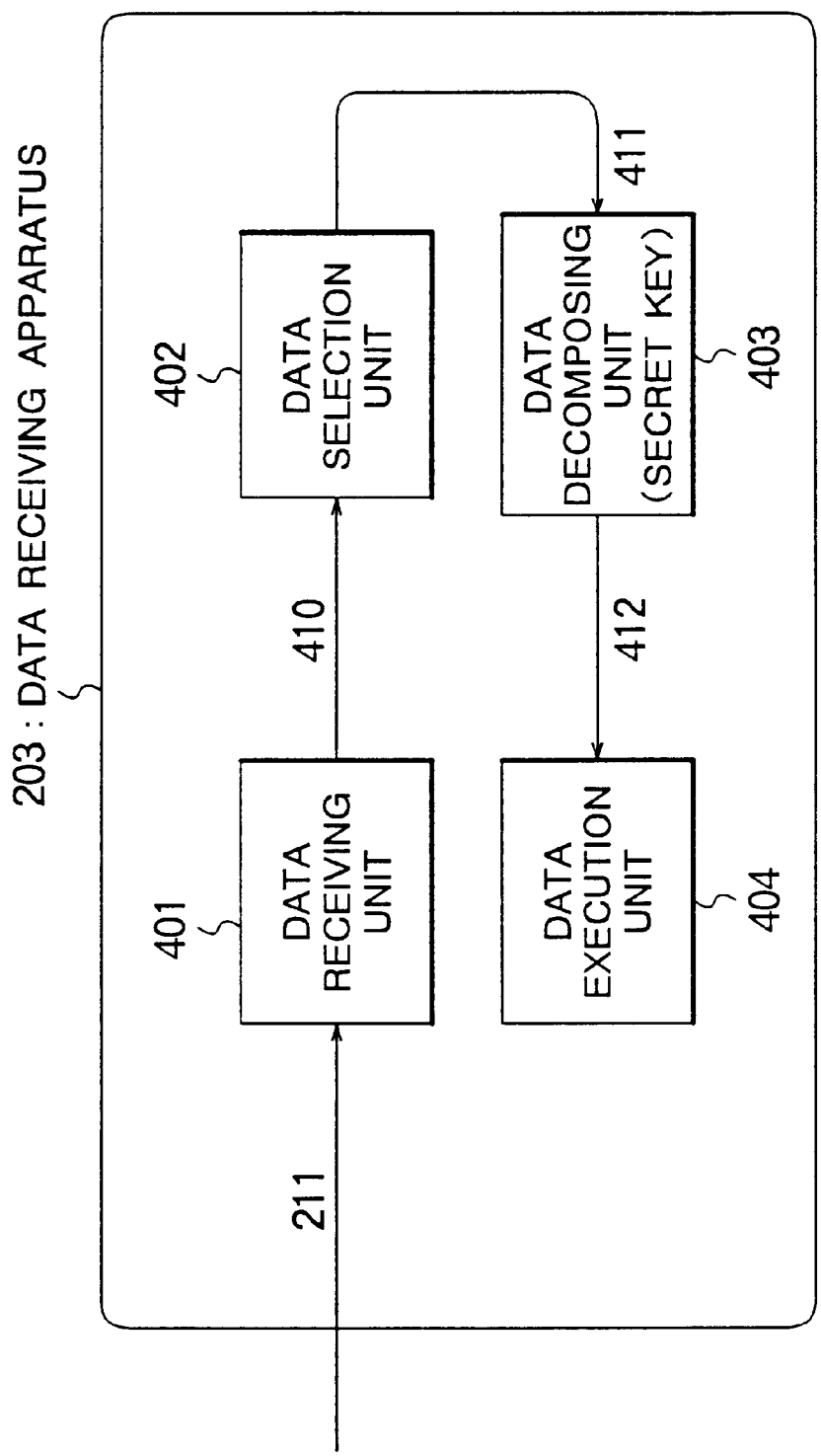
FIG. 5 is a view for explaining the configuration of a data receiving apparatus shown in FIG. 3.

The specific processing carried out in the data decomposing unit 403 of the data receiving apparatus 203 of the user B shown in FIG. 5 is basically an inverse algorithm to the algorithm in the data preparation unit 304 of the data transmission apparatus 201.

First, in the data receiving unit 401 shown in FIG. 5, the transport packets 515, shown in FIG. 7, received via the communications satellite 202 are combined to generate a section 514. Next, the data receiving unit 401 expands the section 515 to generate the MAC frame 513 and outputs this to the data selection unit 402. Then, in the data selection unit 402, based on the destination IP address 801 shown in FIG. 9 contained in the MAC header 602 of the MAC frame 513 shown in FIG. 7, it is determined if this destination IP address 801 and the IP address of the data receiving apparatus 203 coincide. When they coincide, the data selection unit 402 selects the data and outputs the encoded IP packet 511, shown in FIG. 7, contained in this data to the data decomposing unit 403 as the data 411 shown in FIG. 5.

In the data decomposing unit 403, the encoded IP packet 511 shown in FIG. 7 input as the data 411 is decoded by using the secret key known only with the data provider A in advance, then the data error checking etc. are carried out. Here, for example, when for example there is a data error, processing for restoring the data is carried out or the data having the error is discarded.

As explained above, by using the TCP/IP communication protocol and, at the same time, providing a CRC bit in the IP packet, even if digital data is transmitted from the data transmitting apparatus 201 to the data receiving apparatus 203 via the communications satellite 202, data transmission error is effectively prevented from occurring and digital data transfer of a high quality can be realized.

Further, by transmitting the IP packet by the MAC frame system, the data can be transmitted to only the specific users.

Further, the data to be transmitted is encoded and only the data receiving apparatus 153 has a secret key for decoding this. Therefore stealing of the data by another person can be effectively prevented.

The present invention is not limited to the above embodiments. For example, the data compression method of the MAC frame is not limited to the MPEG2. Another compression method can also be used.

Further, the Internet protocol is not limited to the TCP/IP protocol. It is also possible to use for example an OSI (open systems interconnection) system.

Further, in the present embodiment, a case of using a secret key was exemplified as the encoding method, but a similar effect can be obtained even if a public key is used.

First Embodiment of Encoding Unit

Next, a more detailed explanation will be given of the IP packet preparation unit 501 and encoding unit 502 shown in FIG. 6 with reference to the drawings.

Figure 12:
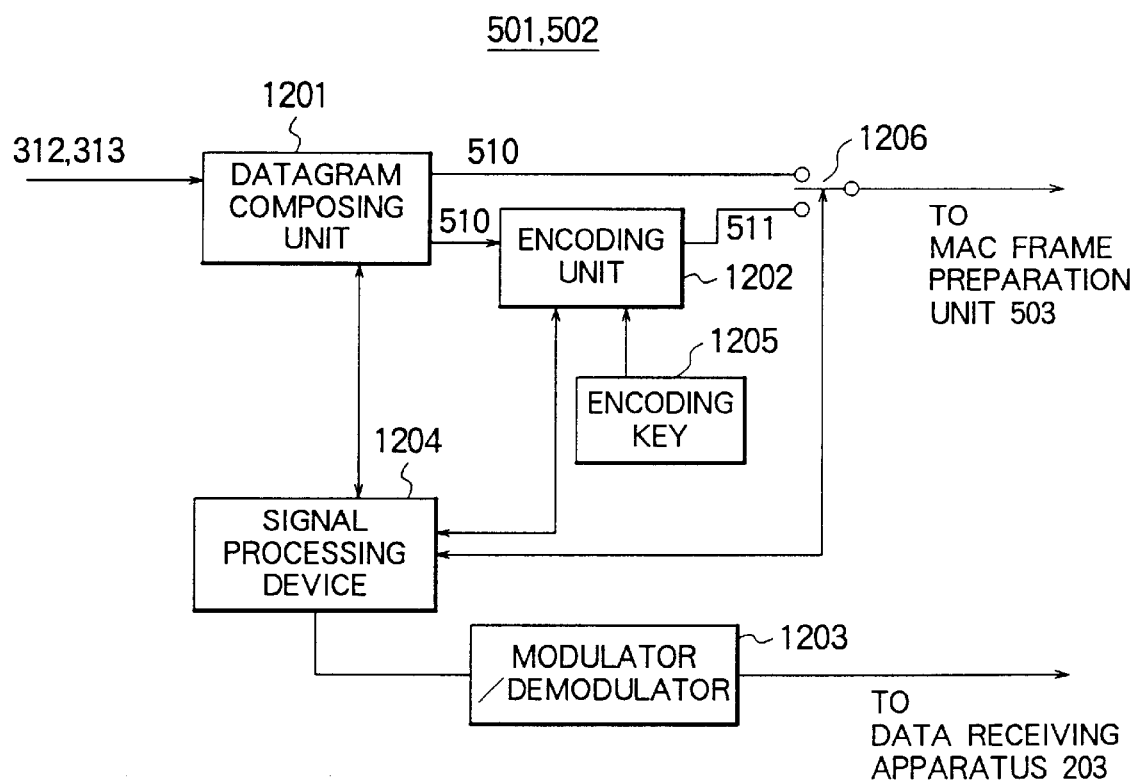
FIG. 12 is a view of the configuration of a first embodiment of an IP packet preparation unit and encoding unit shown in FIG. 6.

FIG. 12 is a view showing a more detailed configuration of the first embodiment of the IP packet preparation unit 501 and encoding unit 502 shown in FIG. 6.

The IP packet preparation unit 501 and the encoding unit 502, as illustrated in FIG. 6, are provided an IP datagram composing unit 1201 for adding an IP packet header to the digital data 312 to be transmitted so as to form an IP packet 510 and an encoder 1202 for encoding the IP packet 510 using the encoding key 1205 to generate the encoded packet 511. The MAC frame preparation unit 503 shown in FIG. 6 has transferred to it encoded data 511 encoded at the encoder 1202 and an IP packet 510 output from the IP datagram composing unit 1201 and not encoded.

The IP packet preparation unit 501 and the encoding unit 502 further are provided with a modulator/demodulator (modem) 1203 for transmitting the decoding key through a public telephone line 204 and a signal processing device 1204 for performing signal processing and control processing. The signal processing device 1204 is for example comprised using a computer. The signal processing device 1204 performs the overall processing and control over the IP datagram composing unit 1201, the encoder 1202, and the modulator/demodulator (modem) 1203.

The IP datagram composing unit 1201 adds an IP packet header to the digital data 312 to be transmitted to generate an IP packet 510. At this time, the signal processing device 1204 judges based on the destination address 712 in the IP header whether to encode the digital data 312. When encoding it, it uses the encoder 1202, comprised as hardware, to encode the digital data 312 using the encoding key (encoding session key) 1205 as a key and sends the encoded data 511 to the MAC frame preparation unit 503. Note that the encoding key 7 is generated by the signal processing device 1204 based on the destination address 712 in the IP packet header.

When not encoding the digital data, the IP packet 510 is sent uncoded from the IP datagram composing unit to the MAC frame preparation unit 503.

At this time, the signal processing device 1204 controls a switch circuit 1206 in accordance with whether encoding is required or not to change the output signal to the MAC frame preparation unit 503.

Figure 13:
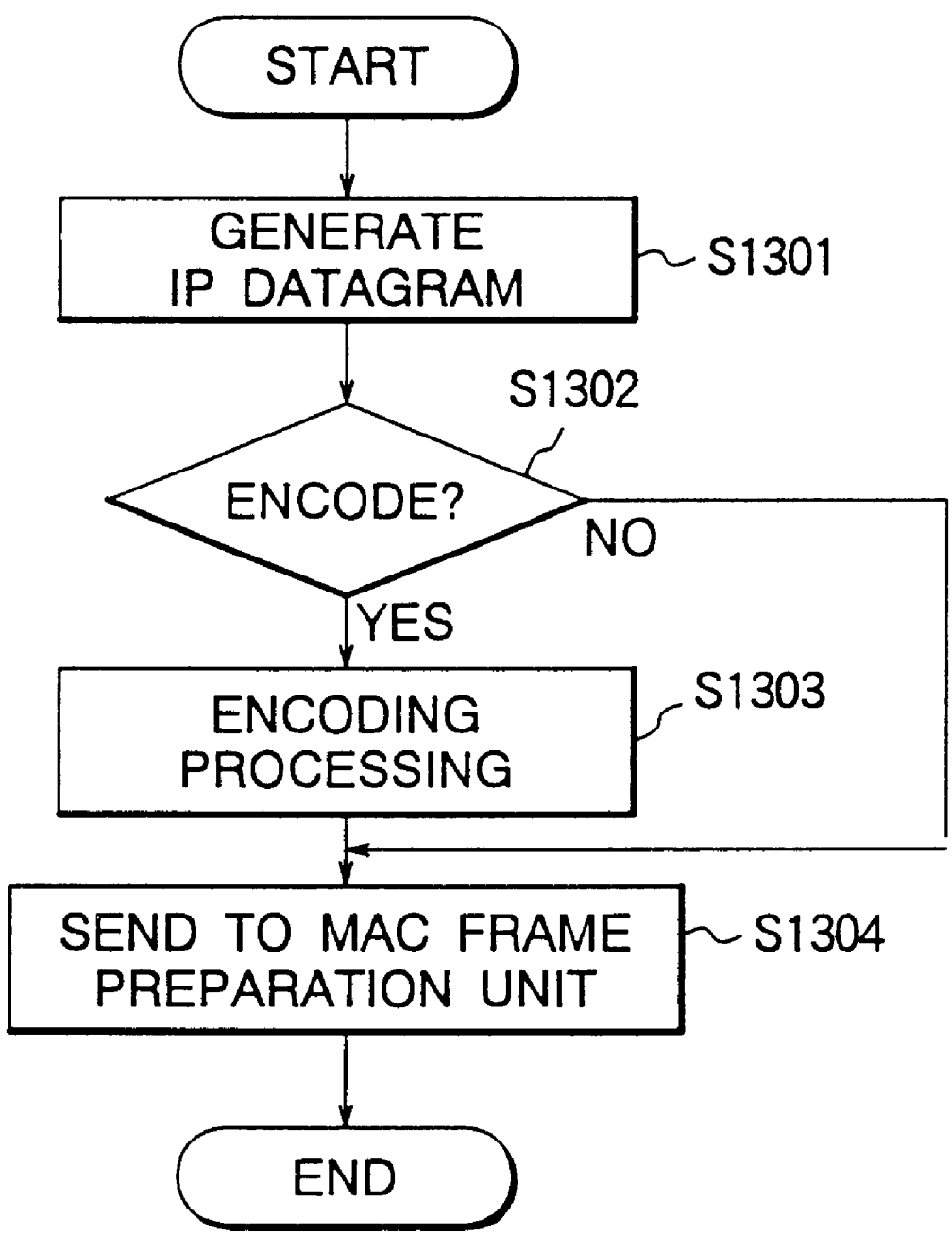
FIG. 13 is a flowchart of the operational processing of the data transmitting apparatus.

FIG. 13 is a flowchart showing the flow of the main processing of the apparatus shown in FIG. 12. At step S1301, the IP datagram composing unit 1201 adds the IP header to the digital data 312 which should be transmitted to generate an IP packet.

At step S1302, the encoding unit 1202 decides whether or not the data is to be encoded by viewing the destination address 712 contained in the IP header. Where it is to be encoded, the processing routine proceeds to step S1303, at which the encoding unit 1202 performs the encoding processing with respect to the digital data 312 which should be transmitted by using the encoding key 1205. Thereafter, the processing routine proceeds to step S1304, at which the encoded IP packet 511 is transferred to the MAC frame preparation unit 503 shown in FIG. 6.

Where it is decided at step S1302 that it is not to be encoded, the processing routine proceeds to step S1304, at which the IP packet 510 which is not encoded is transferred to the MAC frame preparation unit 503 shown in FIG. 6.

In the first embodiment, the encoder 1205 encodes just the IP packet data of the IP packet 510.

The operation routine and control are performed by the signal processing device 1204.

Figure 14:
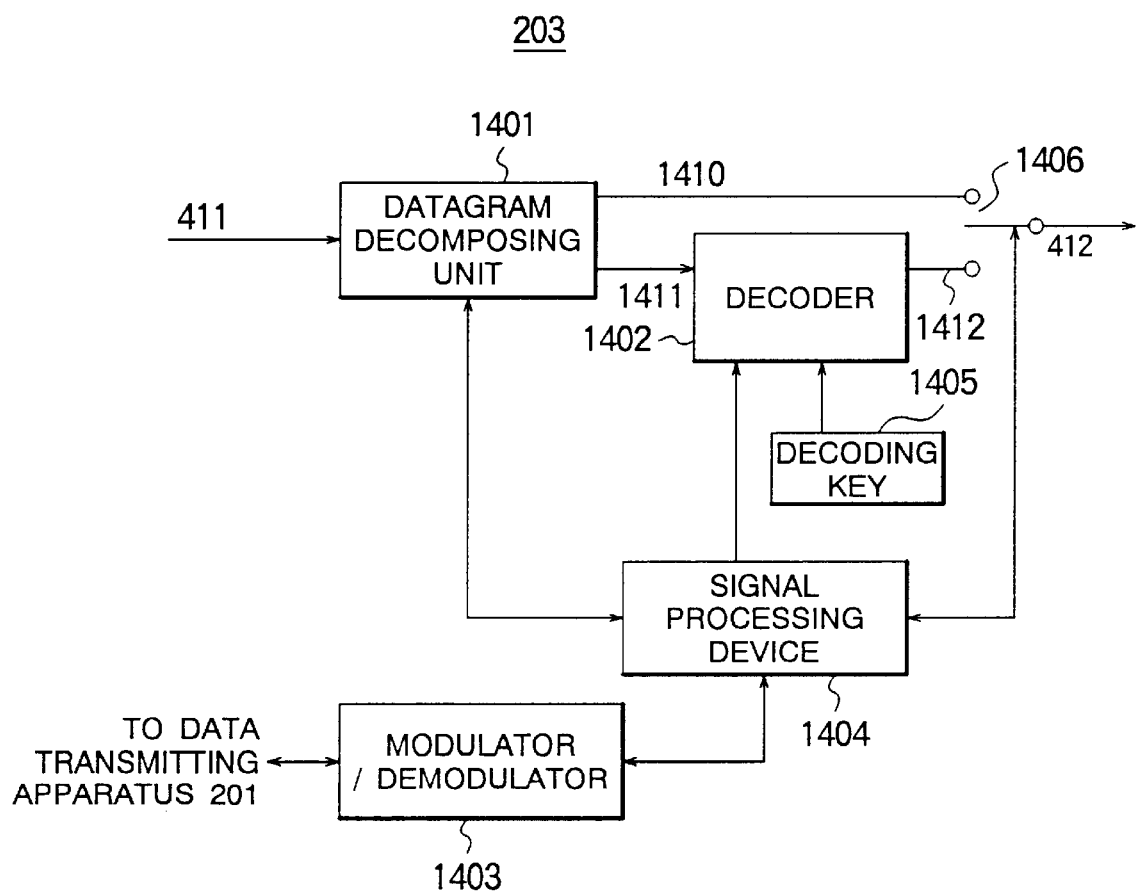
FIG. 14 is a view of the configuration of a first embodiment of a data decomposing unit shown in FIG. 5.

Separate from the transmission of the data using the satellite transmission line (large capacity transmission line), the apparatus uses the public telephone line 204 (small capacity transmission line) to transmit the decoding key 1405 corresponding to the encoding key 1205 from the data transmitting apparatus 201 to the data receiving apparatus 203 between the signal processing device 1204 and the modulator/demodulator (modem) 1203 and between the signal processing device 1404 and the modulator/demodulator (modem) 1403 on the data receiving apparatus 203 side shown in FIG. 14. By this, if the decoding key 1405 corresponding to the encoding key 1205 is used, the decoding of the encoded data 511 becomes possible in the data receiving apparatus 203.

Next, a detailed explanation will be given of the data decomposing unit 403 of the data receiving apparatus 203.

As explained in FIG. 5, in the data receiving apparatus 203, the data receiving unit 401 receives the data 211 from the satellite transmission line. The data selection unit 402 compares the destination IP address 801 in the MAC header 602 with the IP address allocated to the data receiving apparatus 203 to detect if they coincide. If they coincide, it enables reception by the user B and sends the data to the data decomposing unit 403.

FIG. 14 will be used to explain a first embodiment of the data decomposing unit 403.

The IP datagram decomposing unit 101 decomposes the IP header from the digital data 411 sent from the data selection unit 402 and judges whether to decode it or not based on the information of the EN (encryption) 804 in the MAC header. The IP datagram decomposing unit 1401 sends the received data minus the IP header to later circuits, for example, in the case of encoded data, to the decoder 1402 and in the case of plain text data, to the data execution unit 404.

When it should be decoded, the decoder 1402 constituted as hardware uses the decoding key (decoding use session key) 1405 to decode the encoded data 1410 after the decomposing of the IP header into the original data 1412 corresponding to the data 510 which should be transmitted in the data transmitting apparatus 201.

When the data is plain text which does not have to be decoded, the IP datagram decomposing unit 1410 decomposes the IP header and then extracts the original data corresponding to the digital data 510 to be transmitted in the data transmitting apparatus 201 through the switch circuit 1406 as the plain text data 1410 without decoding the same by using the decoding key.

Figure 15:
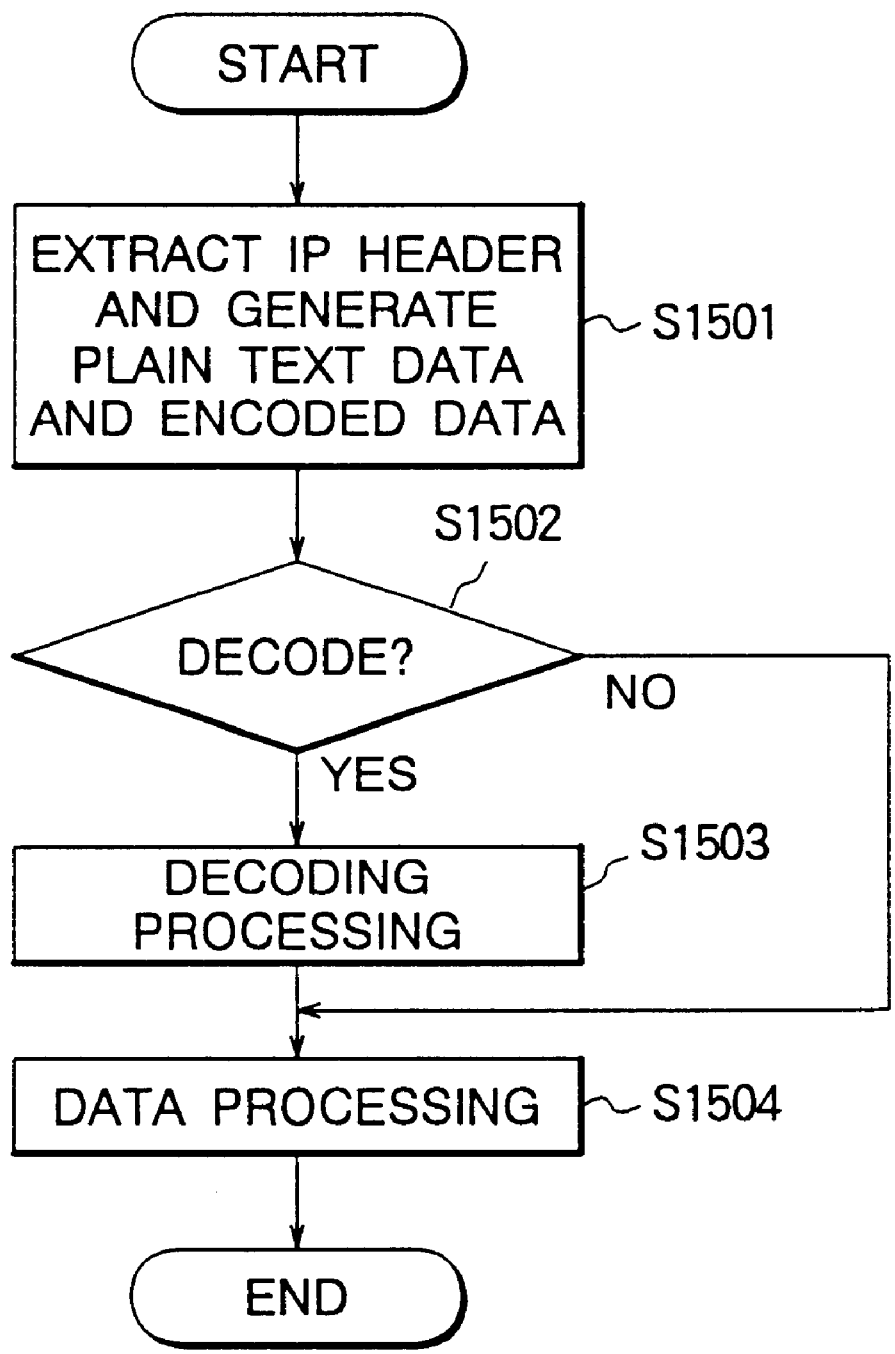
FIG. 15 is a flowchart of the operating processing of a data receiving apparatus.

FIG. 15 is a flowchart showing the flow of the operation processing in the apparatus shown in FIG. 14.

At step S1501, the IP datagram decomposing unit 1401 of the data receiving apparatus 203 extracts the IP header from the data sent from the data selection unit 403 to generate the plain text data 1410 or the encoded data 1411.

At step S1502, the signal processing device 1404 decides whether to decode the encoded data 1411 using the decoding key 1405 based on the information embedded in the EN 804 in the MAC header. When using the decoding key 1405 to decode the encoded data 1411, the processing proceeds to step S1503, where the signal processing device 1404 makes the decoder 1402 perform decoding using the decoding key 1405 and then takes out the data at step S1504.

When not decoding using the decoding key 1405 at step S1502, the processing proceeds to step S1504, where the signal processing device 1404 takes out the plain text data 1410.

As explained above, a large amount of data such as video and audio (AV) data or computer data is encoded and transmitted according to need via the large capacity transmission line 152 such as a satellite transmission line. The encoded AV data can be effectively decoded only in the data receiving apparatus 153 to which the decoding key 1405 has been sent in advance from the transmitting apparatus 151 via a small capacity transmission line 156 such as the public telephone line. Accordingly, data receiving apparatuses 154 and 155 not effectively given the decoding key 1405 shown in FIG. 2, even if receiving encoded data via the satellite transmission line, will receive data having no meaning, thus tapping (stealing) from the data receiving apparatuses 154 and 155 of third persons can be substantially prevented.

A decoding key 1405 corresponding to the encoding key 1205 is transmitted via a public telephone line or other wired small capacity transmission line 156 having a high security compared with a satellite transmission line, therefore even if a tapper monitors only the large capacity transmission line 152, he will not see the decoding key 1405. Accordingly, even if data receiving apparatus 154 and 155 of third persons receive data from the satellite transmission line, if that data has been encoded, it cannot be effectively decoded and in actuality the data is not tapped.

Particularly, since a public telephone line or other small capacity transmission line 156 is a cable line performing one-to-one transmission between the transmitting apparatus 151 and the receiving apparatus 153, receiving apparatuses 14 and 155 intended for tapping are not connected to it, thus tapping or leakage is hard to occur compared with a large capacity transmission line 152 such as a satellite transmission line.

Second Embodiment of Encoding Unit

A second embodiment of the data transmission apparatus of the present invention will be explained next.

Figure 16:
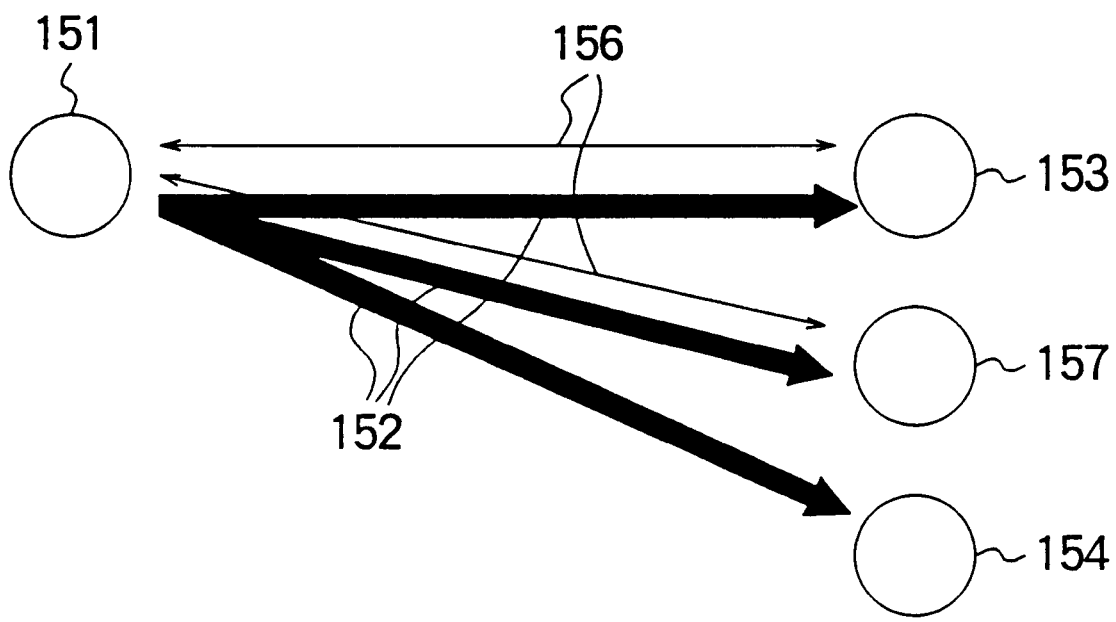
FIG. 16 is a schematic view of the configuration of a second embodiment of a data transmission apparatus of the present invention.

FIG. 16 is a schematic view of the configuration of a data transmission apparatus according to a second embodiment of the present invention.

In the data transmission apparatus illustrated in FIG. 16, two receiving apparatuses 158 and 157 are connected to one transmitting apparatus 151 via a large capacity transmission line (first transmission system) 152 such as a satellite transmission line and a small capacity transmission line (second transmission system) 156, for example, a public telephone line, respectively. The receiving apparatus 154 is a receiving apparatus which is not normally connected to the transmitting apparatus 151 in the same way as the case illustrated in FIG. 2.

The configurations of the large capacity transmission line 152 and the small capacity transmission line 156 are similar to the configurations illustrated in FIG. 3.

In the second embodiment, the decoding key (decoding use session key) and the destination address used in the transmission using the large capacity transmission line 152 are transmitted from the transmitting apparatus 151 to two receiving apparatuses 158 and 157 via the small capacity transmission line 156. The destination address for a broadcast allocated for transmission all at once to a plurality of receiving apparatuses is used as the destination address at this time. The broadcast use destination address uses an IP address different from the IP address allocated individually to each receiving apparatus.

The receiving apparatuses 153 and 157 receiving the destination address from the transmitting apparatus 151 through the small capacity transmission line 156 compare the IP addresses at the data selection unit 502. At that time, they compare the received broadcast use destination address and the destination address 801 in the MAC header 602 sent through the large capacity transmission line 152. By this, the receiving apparatus 153 or 157 can identify if the transmission was directed to itself.

The encoding and decoding processings in the second embodiment were explained using FIG. 12 to FIG. 15, but are the same as those in the first embodiment.

According to the second embodiment, the encoded data is transmitted to a plurality of (in this embodiment, two) receiving apparatuses 153 and 157 by using the large capacity transmission line 152 and can be decoded in the receiving apparatuses.

As an example of such an operation, for example, there are a case where the same encoded data is transmitted from the head office of a certain enterprise to a plurality of branch offices, a case where the encoded data is transmitted to all branch offices one time without transmitting the same to each of the plurality of branch offices, etc. Namely, there is an advantage in that the number of times of transmission can be reduced. Further, even in a case where pay video data is encoded and transmitted to many pay broadcast members, if the destination addresses of the receiving apparatuses on the pay broadcast members side are made the same, by once transmitting the encoded pay video data to these plurality of receiving apparatuses, they can be decoded at the valid receiving apparatus side.

Third Embodiment of Encoding Unit

A third embodiment of the data transmission apparatus of the present invention will be explained next.

The configuration of the data transmission apparatus of the third embodiment is similar to the configurations of the data transmission apparatuses of the first embodiment and the second embodiment mentioned by referring to FIG. 2, FIG. 12, FIG. 14, and FIG. 16. Provided, however, in the first embodiment and the second embodiment, before transmitting the encoded data from the large capacity transmission line 152, the decoding key (decoding session key) was transmitted from the transmitting apparatus 151 to the receiving apparatus 153 via the small capacity transmission line 156, but in the third embodiment, the encoding key (encoding session key) is transmitted in advance from the transmitting apparatus 151 to the receiving apparatus 153 via the small capacity transmission line 156. This encoding key is generated based on the destination address of the receiving apparatus 153 used in the data transmission using the large capacity transmission line 152 in the receiving apparatus 153, that is, the IP address of the receiving apparatus 153. In the receiving apparatus 153, the decoding key corresponding to the encoding key is learned by the preparation of the encoding key.

When the transmitted data is encoded in the transmitting apparatus 151, the encoding processing is carried out by using this encoding key.

The transmission of encoded data and the decoding processing thereof are similar to those of the first embodiment and the second embodiment.

In this third embodiment, the encoding key can be designated by the receiving apparatus 153 to the transmitting apparatus 151.

Fourth Embodiment of Encoding Unit

A fourth embodiment of the data transmission apparatus of the present invention will be explained next.

Figure 17:
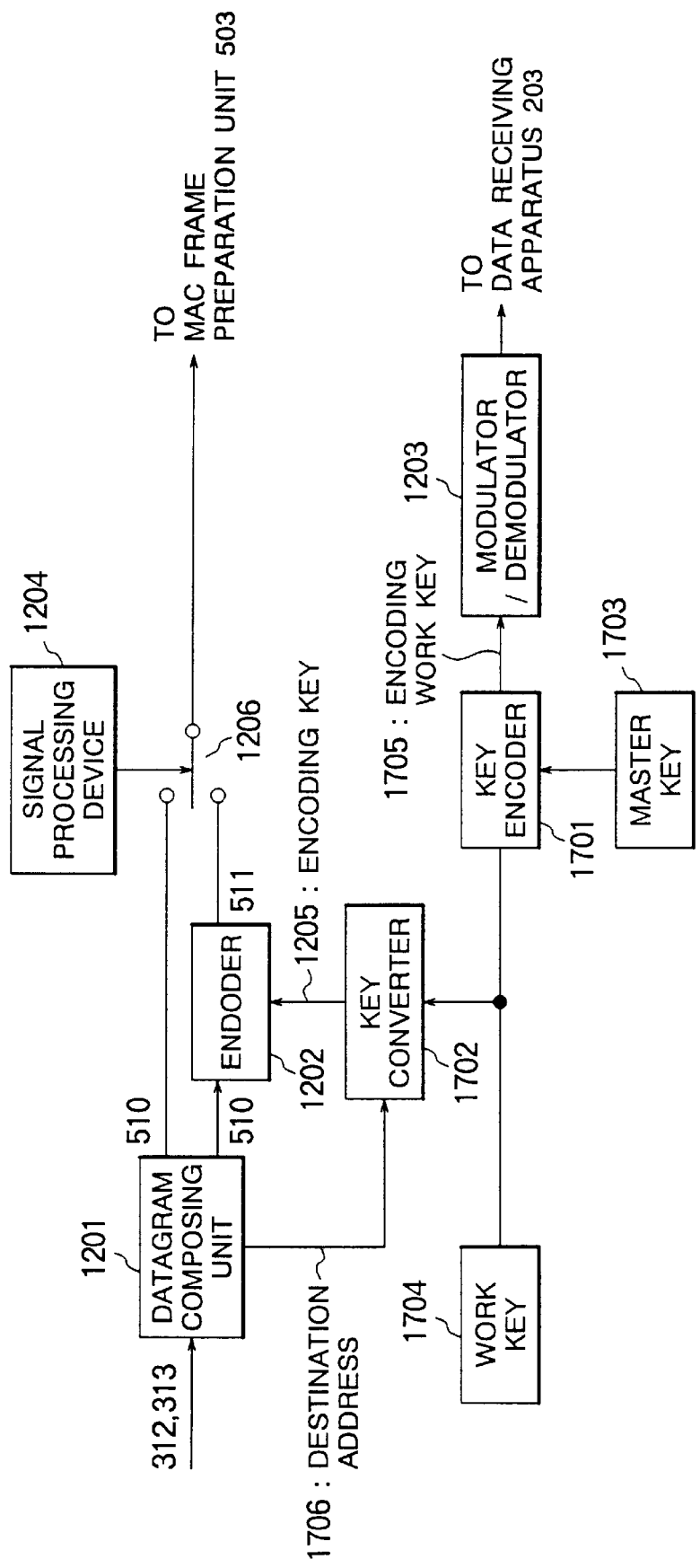
FIG. 17 is a view of the configuration of a fourth embodiment of an IP packet preparation unit and encoding unit shown in FIG. 6.

FIG. 17 is a view of the configuration of the fourth embodiment of the IP packet preparation unit and encoding unit shown in FIG. 6.

The transmitting apparatus 151 and the receiving apparatus 153 are connected via a large capacity transmission line 152 and a small capacity transmission line 156. The connection configuration is similar to the connection configuration illustrated in FIG. 9.

The transmitting apparatus 151 has a modulator/demodulator (modem) 1203 connected to the small capacity transmission line 156, signal processing device 1204, encoding unit (data encoding unit) 1202, and IP datagram composing unit 1201 and, in addition, a key encoding unit 1701 and a key converter 1702. The key encoding unit 1701 generates the work key 1705 encoded from the master key 1703 and the work key 1704. The encoded work key 1705 is received at the modulator/demodulator (modem) 1403 of the receiving apparatus 203 through the modulator/demodulator (modem) 1203.

The IP datagram composing unit 1201 adds the IP header 14 having the destination address of the receiving apparatus 203, which is the destination of transmission of the encoded transmitted data, and a flag indicating whether or not the encoding processing is to be carried out to the digital data 312 which should be transmitted so as to compose the IP datagram 510. The destination address of the IP header is input to the key converter 1702 and used for generating the encoding key (encoding session key) 1205 in the key converter 1702 together with the work key 1704. In this way, the encoding key 1205 is generated based on the destination address of the receiving apparatus 203 in addition to the work key 1704, therefore even if the encoded transmitted data is received at a receiver other than the proper receiving apparatus 203, it cannot be properly decoded. Details of this will be explained later.

The encoding key (session key) 1205 generated by the key converter 1702 is used for encoding the data 510 which should be transmitted in the encoding unit 1202. The data which is encoded at the encoding unit 1202 and transmitted to the large capacity transmission line 152 is the encoded data 511.

The encoded data 511 is obtained by adding the not encoded IP header to the data obtained by encoding the data 510 which should be transmitted and transmitted to the MAC frame preparation unit 503.

Figure 18:
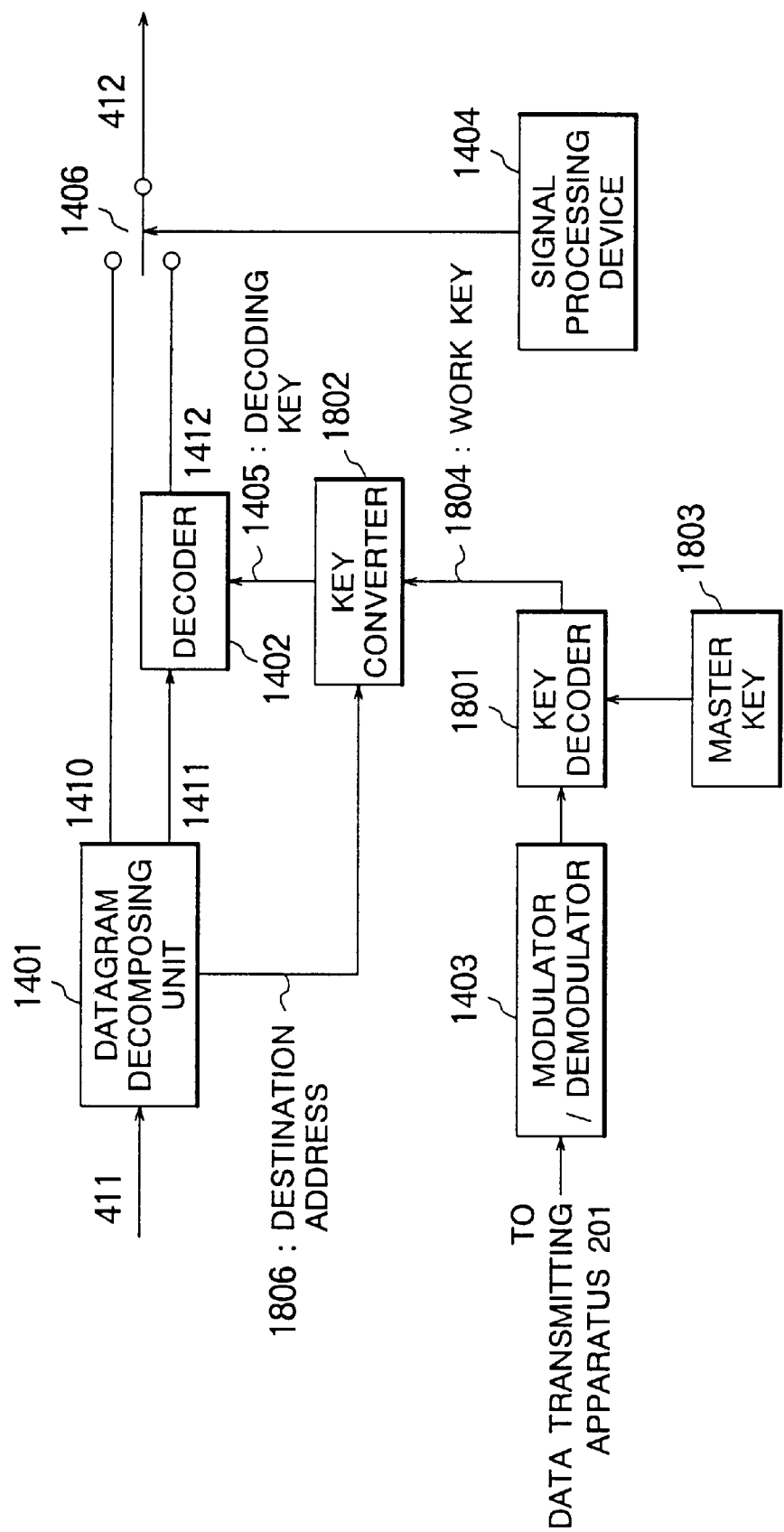
FIG. 18 is a view of the configuration of a fourth embodiment of the data decomposing unit shown in FIG. 5.

FIG. 18 is a view of the configuration of a fourth embodiment of the data decomposing unit shown in FIG. 5.

The apparatus has the modulator/demodulator (modem) 1403 connected to the small capacity transmission line 156, the signal processing device 1404, the IP datagram decomposing unit 1401, the decoder (data decoder) 1402, and, in addition, a key decoder 1801 and a key converter 1802.

The key decoder 1802 decodes the work key 1804 using the work key 1705 and the master key 1803 which are received through the modulator/demodulator (modem) 1403 and encoded.

The IP datagram decomposing unit 1401 decomposes the IP header from the encoded data 411, extracts the destination address (IP address) of the receiving apparatus 203, and supplies this to the key converter 1802.

The key converter 1802 generates the decoding key (decoding session key) 1405 from the destination address and the decoded work key 1804. In the present embodiment, the decoding key 1405 is reproduced by using also the destination address, therefore the proper decoding key cannot be generated in the receiving apparatus which does not have the proper address.

Note that the destination address in the present embodiment not only means the IP address of a single apparatus, but also can mean (designate) a group constituted by a plurality of receiving apparatuses as explained in the second embodiment. In this case, the above encoding processing and decoding processing mean the encoding processing and decoding processing with respect to a plurality of apparatuses.

The decoding key 1405 converted at the key converter 1802 is used for decoding the encoded data 411 received through the large capacity transmission line 152.

The master key 1703 in the transmitting apparatus 201 and the master key 1803 in the receiving apparatus 203 have substantially the same contents. The master key 1703 (1803) is shared by the transmitting apparatus 201 and the receiving apparatus 203 by mailing an object on which the master key 1703 is recorded etc.

The transmitting apparatus 201 generates the work key 1704 and transmits the encoded key 1704 to the small capacity transmission line 156 via the modulator/demodulator (modem) 1203 to transmit this to the receiving apparatus 203. Further, it inputs the work key 1704 to the key converter 1702 and converts this to the encoding key 1205, encodes the digital data 312 which should be transmitted in the encoding unit 1202 by using the converted encoding key (encoding session key) 1205 as the key, and transmits the same as the encoded data 510 to the receiving apparatus 203 via the large capacity transmission line 152.

In the receiving apparatus 203, the encoded work key 1705 received from the small capacity transmission line 156 is decoded at the key decoder 1801 using the master key 1803 to decode the work key 1804. This is converted to the decoding key 1405 by the key converter 1802. The encoded data 411 received from the large capacity transmission line 152 is decoded at the decoder 1402 by using the converted decoding key (decoding session key) 1405 as the key.

The encoding processing of the work key in the transmitting apparatus 201 of the data transmission apparatus of the fourth embodiment is carried out so as to obtain the work key in the receiving apparatus 203 by using inherent information such as a serial number of the receiving terminal possessed by the receiving apparatus 203 which has been already shared by the transmitting apparatus 201 and the receiving apparatus 203 as a key (master key).

In the fourth embodiment, the encoded work key 1705 is transmitted through a small capacity transmission line 156, therefore even if there is leakage of the work key, there is almost no possibility of generation of the decoding key 1405 so far as the master key 1703 is not known. Therefore the security of the key transmission is very high. Accordingly, it is difficult for a receiving apparatus 203 of a third person to correctly decode the encoded data 411 transmitted through the large capacity transmission line 152 and the safety against also the leakage of information becomes higher.

Further, in the fourth embodiment, the generation (conversion) of the encoding key 1205 and the decoding key 1405 is carried out by using also the IP address of the receiving apparatus 203 of the destination of transmission, therefore the proper encoding unit 6 can be generated (reproduced) only in the proper receiving apparatus 203 and even if the encoded data 411 is received, the encoded data 411 cannot be correctly decoded.

First Modification of Fourth Embodiment

An example of encoding the work key 1704 in the transmitting apparatus 201 and transmitting the same as the encoded work key 1705 to the receiving apparatus 203 was shown in FIG. 17 as a preferred embodiment, but in the fourth embodiment, the encoding key 1205 and the decoding key 1405 are converted by using the IP address (destination address) of the receiving apparatus 201 and thus the security has become higher. Therefore, it is also possible to directly pass the work key 1704 through the small capacity transmission line 156 and use the same for the conversion of the decoding key (decoding session key) 1405 in the key converter 1802.

Namely, the key encoding unit 1701 in the transmitting apparatus 201 and the key decoder 1801 in the receiving apparatus 203 illustrated in FIG. 17 can be deleted. In this case, it is not necessary to store the master key 1703 in the apparatuses of the master key 1803, so the procedure between the transmitting apparatus 201 and the receiving apparatus 203 becomes simpler.

Second Modification of Fourth Embodiment

Further, the fourth embodiment explained referring to FIG. 17 gave, as a preferred embodiment, a case of generating the encoding key 1205 by using the work key 1704 and the destination address in the key converter 1702 in the transmitting apparatus 201 and encoding the data 510 using the encoding key 1205 at the encoder 1202, but as a simple example of the fourth embodiment, in the key converter 1702, the encoding key 1205 can be generated by using only the work key 1704 without using the destination address. In this case, the configuration of the key converter 1702 becomes simpler.

Similarly, also in the key converter 1802 in the receiving apparatus 203, it is possible to generate the decoding key 1405 by using the same master key 1803 as the master key 1703 and decode the received encoded data by using that decoding key 1405. Also in this case, the configuration of the key converter 1802 becomes simpler.

Third Modification of Fourth Embodiment

Further, it is also possible to combine the first modification and the second modification of the above fourth embodiment. Namely, according to the first modification of the fourth embodiment, the key encoding unit 1701 in the transmitting apparatus 201 and the key decoder 1801 in the receiving apparatus 201 illustrated in FIG. 17 are deleted and, according to the second modification, the configurations of the key converter 1702 and the key converter 1802 are made simpler.

Fifth Embodiment of Encoding Unit

A fifth embodiment of the data transmission apparatus of the present invention will be explained next.

Figure 19:
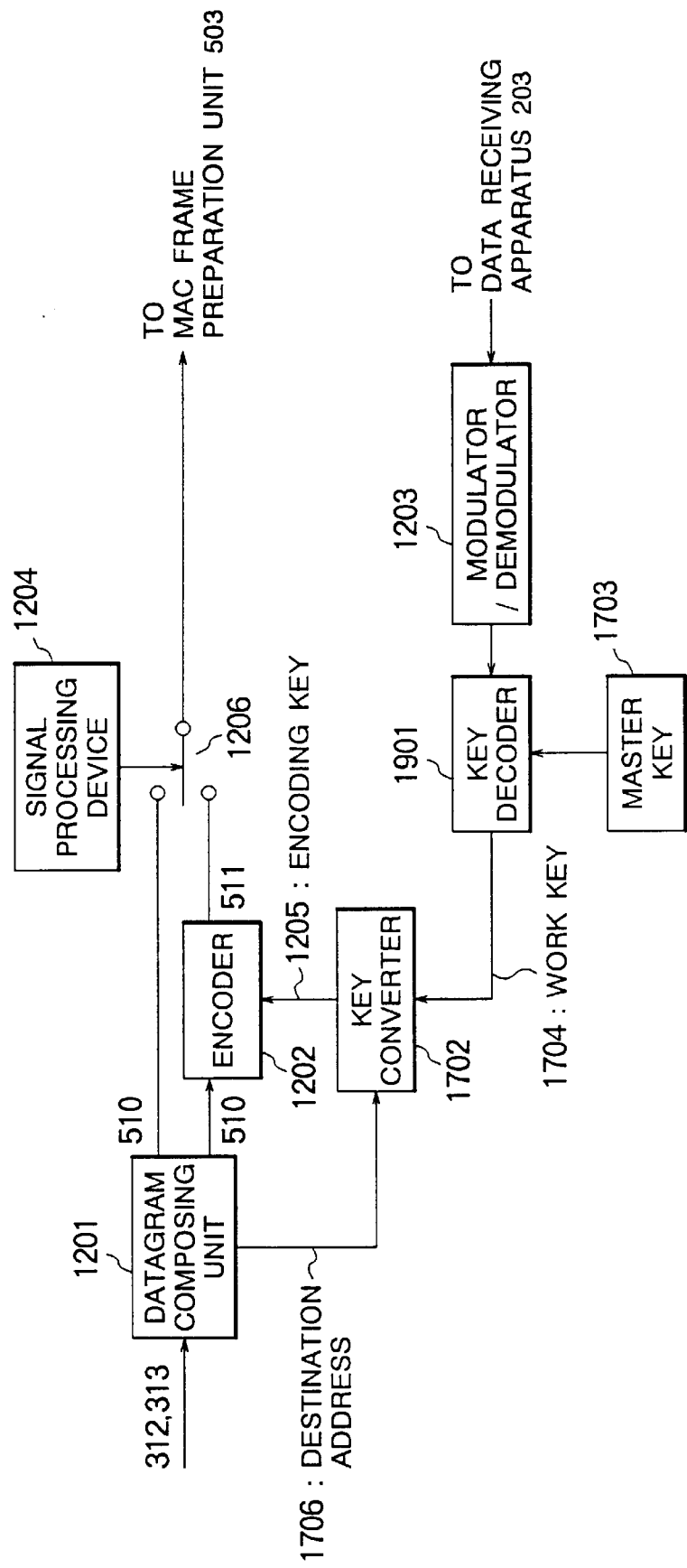
FIG. 19 is a view of the configuration of a fifth embodiment of an IP packet preparation unit and encoding unit shown in FIG. 6.
Figure 20:
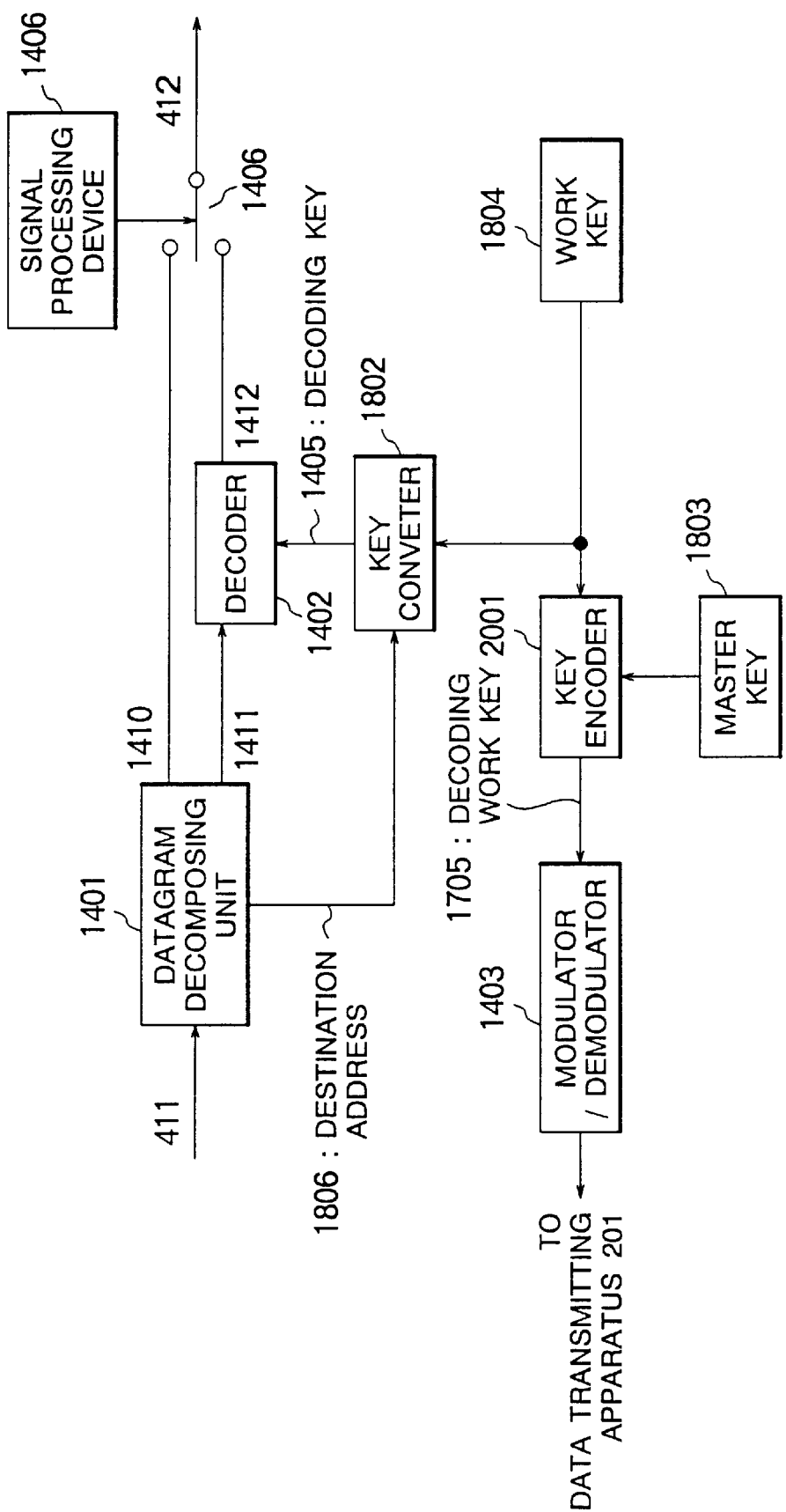
FIG. 20 is the configuration of a fifth embodiment of the data decomposing unit shown in FIG. 5.

FIG. 19 and FIG. 20 are views of the configuration of the fifth embodiment of the IP packet preparation unit and encoding unit shown in FIG. 6.

In the fourth embodiment, the encoded key 1705 was transmitted from the transmitting apparatus 201 to the receiving apparatus 203 by using a small capacity transmission line 156, but in the fifth embodiment, the encoded work key is transmitted from the receiving apparatus 203 to the transmitting apparatus 201 through the small capacity transmission line 156, and in the transmitting apparatus 201, the work key 1704 is decoded from the encoded work key 1705, and the encoding key 1205 is converted from this work key 1704.

For this reason, the transmitting apparatus 201 is provided with a key decoder 1901 equivalent to the key decoder 1801 in place of the key encoding unit 1701 illustrated in FIG. 17, and the receiving apparatus 203 is provided with a key encoding unit 2001 equivalent to the key encoding unit 1701 instead of the key decoder 1801 shown in FIG. 18. The rest of the configuration and operation are similar to those of the fourth embodiment.

In the fifth embodiment, the encoding key can be designated from the receiving apparatus 203 to the transmitting apparatus 201. The security of the key and the security of the encoding data 411 in the fifth embodiment are equivalent to those of the fourth embodiment.

Modification of Fifth Embodiment

In FIG. 19 and FIG. 20, as a preferred embodiment, an example was explained of encoding the work key 1804 at the receiving apparatus 203 and transmitting the encoded work key 1705 to the transmitting apparatus 201 through the small capacity transmission line 156, but in the fifth embodiment, similar to the fourth embodiment, the encoding key 1205 and the decoding key 1405 have been converted by using the destination address of the receiving apparatus 203, thus the security is high, and therefore it is also possible to directly send the work key 1804 through the small capacity transmission line 156 and use it for the conversion of the encoding key 1205 in the key converter 1702 of the transmitting apparatus 201.

Namely, the key decoder 1901 in the transmitting apparatus 201 and the key encoding unit 2001 in the receiving apparatus 203 can be deleted. In this case, the master key 1703 and the master key 1803 are no longer necessary, so the procedure becomes simple.

Other than this, also for the fifth embodiment, various simple configurations mentioned as modifications of the fourth embodiment can be adopted.

Sixth Embodiment of Encoding Unit

A sixth embodiment of the data transmission apparatus of the present invention will be explained next.

In the fourth embodiment and the fifth embodiment, in the transmitting apparatus 201 and the receiving apparatus 203, preferably, provision is made of a key converter 1702 for converting the work key 1704 to the encoding key (encoding session key (1205 and a key converter 1802 for converting the work key 1804 to the decoding key (decoding session key) 1405, as explained as the modification of the fourth embodiment, from the work key 1704 and the destination address.

Contrary to this, in the sixth embodiment, by using the input of the key converter 1702 of the transmitting apparatus 201 as the destination address in the transmission using the work key 1704 and the large capacity transmission line 152, the encoding key (encoding use session key) 1205 is generated from these information. Similarly, the input of the key converter 1802 of the receiving apparatus 203 is used as the work key 1804 and the IP address of the receiving apparatus 203, and the decoding key (decoding session key) 1405 is generated from these information. The rest of the configuration and operation are similar to those of the fourth embodiment.

Note that, also in the sixth embodiment, the destination address not only means the IP address of a single apparatus, but also can mean (designate) a group constituted by a plurality of receiving apparatuses. In this case, the above encoding processing and decoding processing mean the encoding processing and decoding processing with respect to a plurality of apparatuses.

In the sixth embodiment, it is difficult for a person who does not know the destination address to generate the session key, therefore there is an advantage that the safety of the transmission of key becomes higher.

Seventh Embodiment of Encoding Unit

A seventh embodiment of the data transmission apparatus of the present invention will be explained next.

Figure 21:
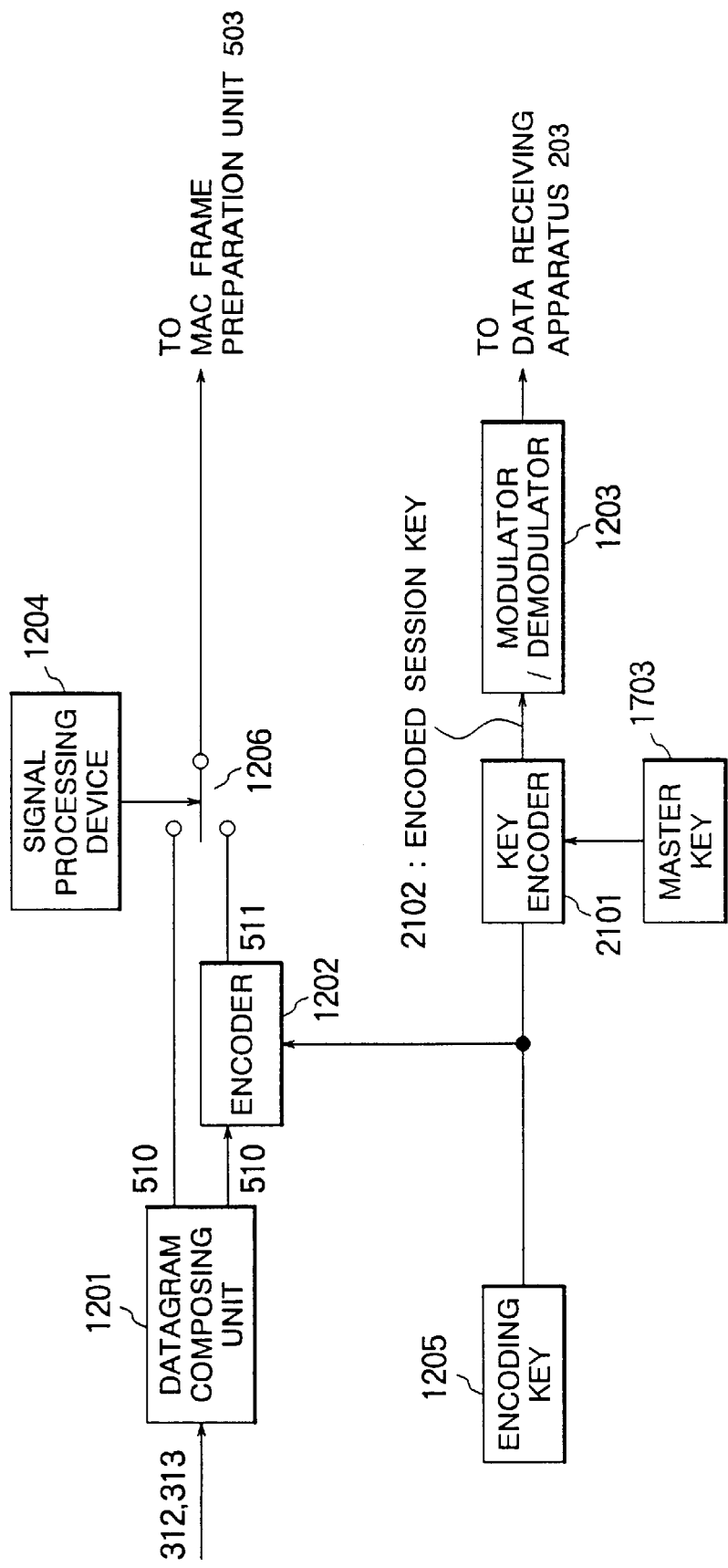
FIG. 21 is a view of the configuration of a seventh embodiment of an IP packet preparation unit and encoding unit shown in FIG. 6.

FIG. 21 is a view of the configuration of the seventh embodiment of the IP packet preparation unit and encoding unit of the present invention.

Figure 22:
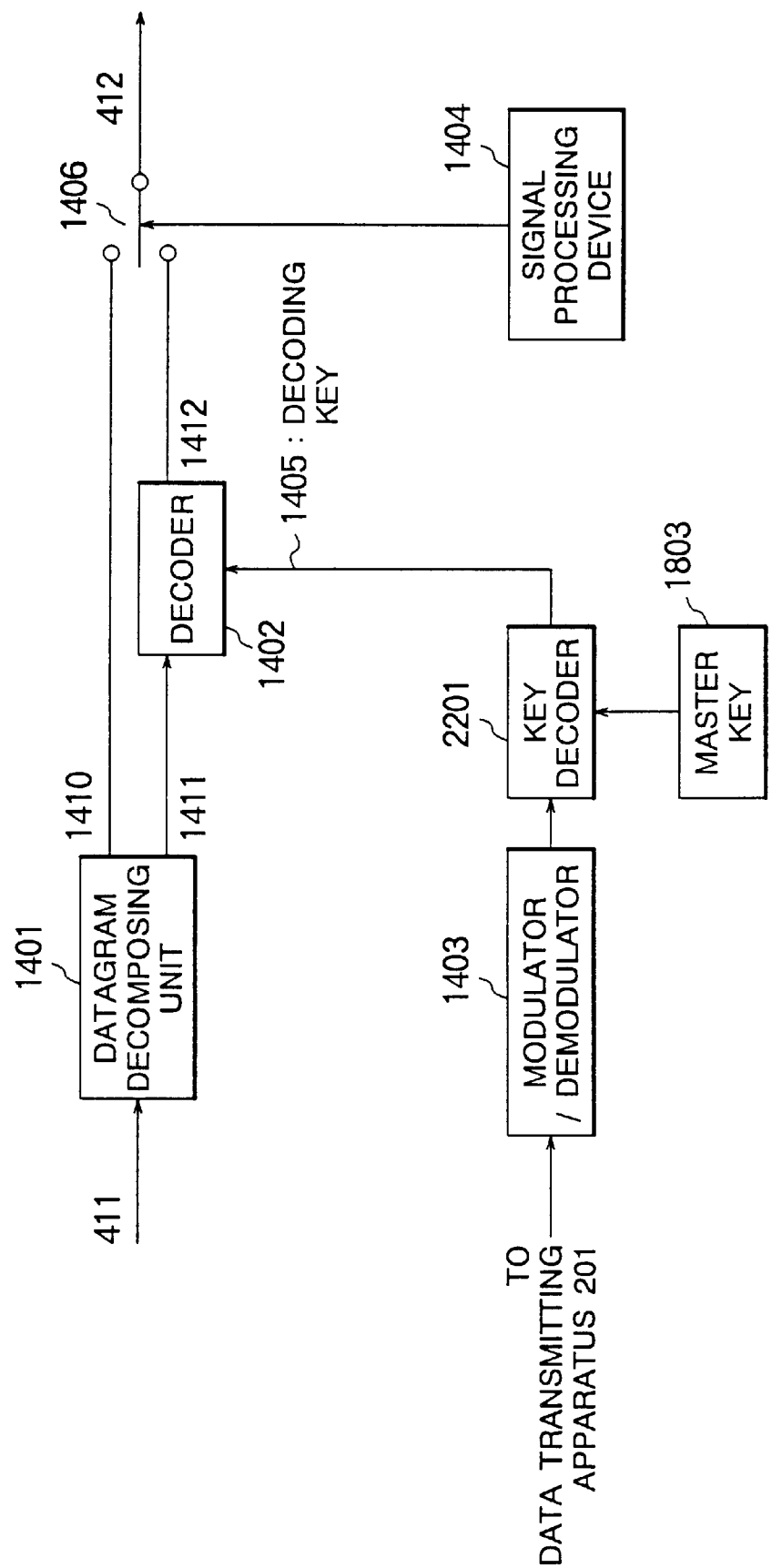
FIG. 22 is a view of the configuration of a seventh embodiment of the data decomposing unit shown in FIG. 5.

FIG. 22 is a view of the configuration of the seventh embodiment of the data decomposing unit shown in FIG. 5.

The transmitting apparatus 201 has the encoding unit 1202 and the key encoding unit 2101. The receiving apparatus 203 has the decoder 1402 and the key decoder 2201. Note that, for simplifying the explanation, in FIG. 21, the explanation of the IP datagram composing unit 1201, the signal processing device 1204, and the modulator/demodulator 1203 shown in FIG. 12 and, in FIG. 22, the explanation of the IP datagram decomposing unit 1401, signal processing device 1404, and modulator/demodulator 1403 shown in FIG. 14 are omitted. Also in the present embodiment, however, the processing of whether or not the processing and encoding of the destination data defined in the IP header 14 are to be performed is carried out similar to the above embodiments.

In the fourth embodiment, the encoded work key 1705 is transmitted from the transmitting apparatus 201 to the receiving apparatus 203 by using the small capacity transmission line 156, and in the fifth embodiment, the encoded work key 1705 is transmitted from the receiving apparatus 203 to the transmitting apparatus 201 by using the small capacity transmission line 156.

Contrary to this, in the seventh embodiment, the encoded session key 2102 is transmitted from the transmitting apparatus 201 to the receiving apparatus 203 by using the small capacity transmission line 156.

Further, where the number of receiving apparatus is one, the encoded session key 2102 is transmitted from the receiving apparatus 203 to the transmitting apparatus 201 by using the small capacity transmission line 156.

This encoding key (session key) 1205 is generated based on the destination address in the encoded data transmission using the large capacity transmission line 152.

In the transmitting apparatus 201, the encoding key (encoding session key) is generated, which is encoded by using the key encoding unit 2101 by using the master key 1703 shared by the transmitting apparatus 201 and the receiving apparatus 203 as the key, and the encoded session key 2102 is sent to the receiving apparatus 203 by using the small capacity transmission line 156. In the transmitting apparatus 201, the data 312 which should be transmitted is encoded by using the encoding unit 1202 using the generated encoding key 1205 as the key and sent to the MAC frame preparation unit 503.

The receiving apparatus 203 decodes the encoded session key 2102 received from the small capacity transmission line 156 by using the master key 1803 as the key to obtain the decoding key (decoding session key) 1405. In the receiving apparatus 203, the encoded data 411 received from the large capacity transmission line 152 is decoded at the decoder 1402 by using the decoding key 1405 found as described above as the key.

In the seventh embodiment, compared with the fourth embodiment and the fifth embodiment, the encoded session key 2102 is directly transmitted from the transmitting apparatus 201 to the receiving apparatus 203, therefore there is an advantage in configuration that the key converter 1702 and the key converter 1802 in the transmitting apparatus 201 and the receiving apparatus 203 are not required.

Eighth Embodiment of Encoding Unit

An eighth embodiment of the data transmission apparatus of the present invention will be explained next.

Figure 23:
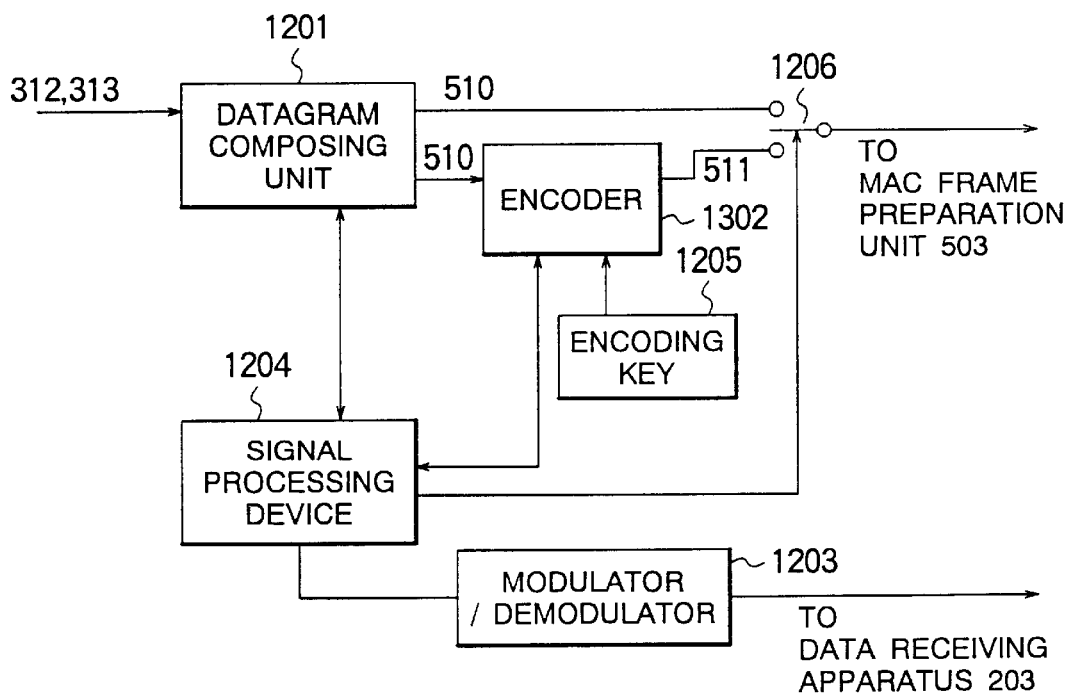
FIG. 23 is a view of the configuration of an eighth embodiment of an IP packet preparation unit and encoding unit shown in FIG. 6.

FIG. 23 is a view of the configuration of the eighth embodiment of the IP packet preparation unit and encoding unit shown in FIG. 6.

The transmitting apparatus 201 has the IP datagram composing unit 1201 and the encoding unit 2302. The receiving apparatus 203 has the decoder 2402 and the IP datagram decomposing unit 1401.

In the transmitting apparatus 201, the data 312 which should be transmitted is input to the IP datagram composing unit 1201 and added with the IP header so as to form the IP datagram 510. The encoding unit 2302 encodes not only the IP packet data of the IP packet, but also the IP packet header. The data including the encoded data of the IP packet header is transmitted to the MAC frame preparation unit 503.

Figure 24:
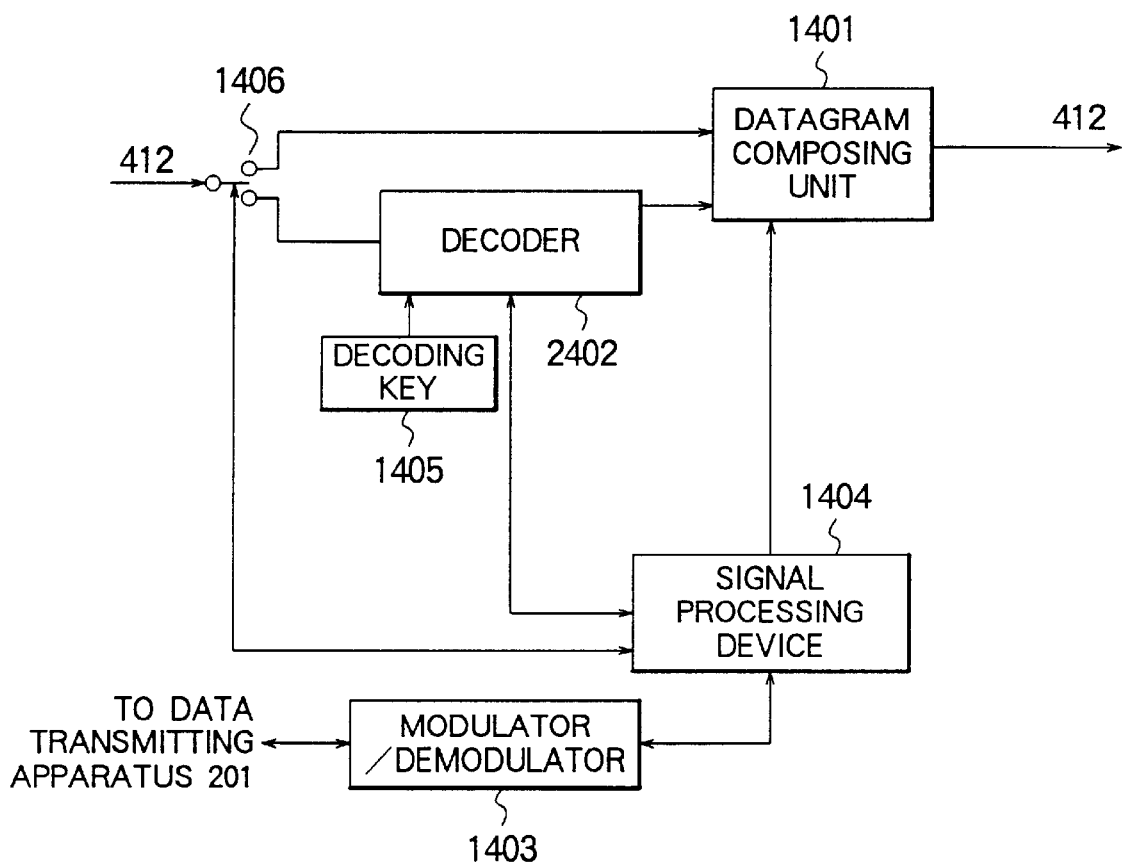
FIG. 24 is a view of the configuration of an eighth embodiment of the data decomposing unit shown in FIG. 5.

FIG. 24 is a view of the configuration of an eighth embodiment of the data decomposing unit shown in FIG. 5.

The receiving apparatus 203 decodes the data 411 encoded including the IP packet header received from the large capacity transmission line 152 at the decoder 2402. The IP datagram decomposing unit 1401 decomposes the decoded IP packet and removes the IP data packet to obtain the data 412.

Note that, in the present embodiment, any of the above first to seventh embodiments can be applied to the transfer of the encoding key or information for generating the encoding key between the transmitting apparatus 201 and the receiving apparatus 203 using the small capacity transmission line 156 or the transfer of the decoding key or information for generating the decoding key between the transmitting apparatus 201 and the receiving apparatus 203. Namely, the present embodiment shows an example where also the IP header is also to be encoded. Any of the above embodiments can be applied to the transmission method of the encoding key or decoding key using the small capacity transmission line 156.

In the eighth embodiment, in the transmitting apparatus 201 or the receiving apparatus 203, a decision of whether or not the data being transmitted is encoded or decoded can be omitted.

In the eighth embodiment, the IP address used by only the user B is contained in the header of the IP packet 510, therefore it may seem that the encoding by the secret key used by only the user B is not necessary, but it becomes necessary so as to prevent another person from stealing the data directed to the user B by using the IP address of the user B and disguising itself as the user B.

Other Embodiments

In all of the above embodiments, as explained using FIG. 6, the IP packet preparation unit 501 prepared the IP packet, then the MAC frame preparation unit 503 prepared the MAC frames, but as shown in the first to the seventh embodiments, when encoding just the IP packet data without encoding the IP packet header of the IP packets, it is possible to omit the MAC frame preparation unit 503.

As shown in FIG. 8, the destination IP address 712 is embedded in the IP packet header, so by checking the IP packet header received at the receiving apparatus 203 side, it is possible to judge if the data is directed to itself without decoding the data.

Further, the information of the CP 803 and EN 804 in the MAC header 602 may be embedded in the option 712 of the IP packet header.

All of the above embodiments were illustrated for the case using the Internet protocol (IP), but in the working of the present invention, the invention is not limited to the Internet protocol. Other transmission protocol, for example, protocol according to ATM (asynchronous transfer mode) etc. can be used.

Also, in the working of the present invention, the above various embodiments can be appropriately combined.

As explained above, by transmitting information for generating the key for the processing of encoding or decoding by using a small capacity transmission line different from the large capacity transmission line for transmitting the data, the security of the transmission of the key is enhanced and thus the safety becomes high with respect to the leakage of the encoded data transmitted via the large capacity transmission line.

Further, by adding the destination data as the control information, it becomes possible to effectively decode the encoded data only in the proper receiving apparatus.

Further, by embedding information on the presence of coding of the data in the control information of the transmitted data, it is possible to judge the need of encoding and decoding by just viewing the control information necessary for the transmission.

Further, by using the TCP/IP communications protocol and providing a CRC bit in the IP packet, even when transmitting digital data from a transmitting apparatus through a communications satellite to a receiving apparatus, it is possible to effectively suppress the generation of data transmission errors and achieve a high quality digital data transfer.

Further, by transmitting by the MAC frame format, it is possible to not only deliver data by the broadcast format (simultaneous broadcast), but also to transmit data by a wireless format to just one or more specified users.

EXPLANATION OF REFERENCES

101 . . . transmitting apparatus (transmitter)
102 . . . receiving apparatus (receiver)
103 . . . tapping apparatus (tapper)
104 . . . data transmission line
105 . . . data to be transmitted
106 . . . encoder provided in transmitting apparatus
107 . . . encoding key used for encoding in encoder (encoding session key)
108 . . . decoding key (decoding session key)
109 . . . decoder for decoding encoded data received from data transmission line using decoding key
110 . . . decoded data

What is claimed is:

1. A data transmission apparatus connected to a first transmission system and a second transmission system and connected to at least one data reception apparatus for decoding a received encoded data by using a decoding key, the data transmission apparatus comprising:

a key transmitting means for transmitting decoding key information for decoding encoded data and destination information associated with the encoded data to be transmitted to the first transmission system, to said data reception apparatus through the second transmission system, a generating means for adding first transmission control information including transmission information indicating a destination information of a data receiving apparatus to which a transmission data is transmitted, to the data to be encoded and transmitted so as to generate transmitted data, an encoding means for encoding at least the transmission data based on encoding key information corresponding to the decoding key information to generate encoded data, and a data transmitting means for transmitting to the first transmission system the encoded data generated by the encoding means.

2. A data transmission apparatus as set forth in claim 1, wherein the communication capacity per unit time of the first transmission system is larger than the communication capacity per unit time of the second transmission system.

3. A data transmission apparatus as set forth in claim 2, wherein the first transmission system includes a satellite transmission line.

4. A data transmission apparatus as set forth in claim 3, wherein the second transmission system includes a cable transmission line.

5. A data transmission apparatus as set forth in claim 1, wherein the key transmitting means transmits the same decoding key information and destination information to a plurality of receiving apparatuses connected to a first transmission system and a second transmission system.

6. A data transmission apparatus as set forth in claim 1, wherein the encoding means generates encoded data from the data based on the encoding key information and the destination information of the transmitted data.

7. A data transmission apparatus as set forth in claim 1, further comprising key encoding means for encoding a work key information to generate decoding key information.

8. A data transmission apparatus as set forth in claim 7, wherein the encoding means generates encoded data from the data based on the work key information and the destination information of the transmitted data.

9. A data transmission apparatus as set forth in claim 1, wherein the first transmission control information includes an address defined by an Internet protocol as the destination information.

10. A data transmission apparatus as set forth in claim 1, wherein the encoding means encodes the transmitted data including the first transmission control information.

11. A data transmission apparatus as set forth in claim 1, wherein the encoding means adds to the transmitted data second transmission control information including the same destination information as the destination information included in the first transmission control information to generate the encoded data.

12. A data transmission apparatus as set forth in claim 11, wherein the encoding means adds to the encoded data a CRC check bit.

13. A data transmission apparatus as set forth in claim 11, wherein the second transmission control information includes information indicating the presence of coding of the data to be transmitted.

14. A data transmission apparatus as set forth in claim 13, wherein the second transmission control information includes information for distinguishing whether the data to be transmitted is information responding to a request from a receiving apparatus or whether it is control information for operating the communications system including the data transmitting apparatus.

15. A data transmitting apparatus connected to a first transmission system and a second transmission system and connected to at least one data reception apparatus for decoding a received encoded data by using a decoding key, the data transmitting apparatus comprising:

a key receiving means for receiving encoding key information for encoding encoded data and destination information associated with the encoded data to be transmitted to the first transmission system, from the data reception apparatus through the second transmission system, a data generating means for adding control information including transmission information indicating a destination information of a data receiving apparatus to which a transmission data is transmitted to the data to be encoded and transmitted to generate transmitted data, an encoding means for generating encoded data from the transmission data based on the encoding key information, and a data transmitting means for transmitting through the first transmission system the encoded data generated by the encoding means.

16. A data transmitting apparatus as set forth in claim 15, wherein the encoding means comprises key decoding means for decoding the encoding key information to generate work key information, and uses the work key information decoded by the key decoding means to generate encoded data.

17. A data transmitting apparatus as set forth in claim 16, wherein the encoding means generates encoded data based on the work key information and the destination information of the encoded data.

18. A data transmission method for transmitting data using a first transmission system and a second transmission system and connected to at least one data reception apparatus for decoding a received encoded data by using a decoding key, the data transmission method comprising:

a key transmitting step for transmitting other decoding key information for decoding encoded data along with destination information associated with the encoded data to be transmitted to the first transmission system, to the second transmission system, a data generating step for adding first transmission control information including transmission information indicating a destination information of a data receiving apparatus to which a transmission data is transmitted, to the data to be encoded and transmitted to generate transmission data, an encoding step for encoding the generated transmission data based on encoding key information corresponding to the decoding key information to generate encoded data, and a data transmitting step for transmitting the encoded data generated in the encoding step to the first transmission system.

19. A data transmission method as set forth in claim 18, wherein the communication capacity per unit time of the first transmission system is larger than the communication capacity per unit time of the second transmission system.

20. A data transmission method as set forth in claim 19, wherein the first transmission system includes a satellite transmission line.

21. A data transmission method as set forth in claim 19, wherein the second transmission system includes a cable transmission line.

22. A data transmission method as set forth in claim 18, wherein the key transmitting step transmits the same decoding key information and destination information to a plurality of receiving apparatuses connected to a first transmission system and a second transmission system.

23. A data transmission method as set forth in claim 18, wherein the encoding step generates encoded data from the data based on the encoding key information and the destination information of the transmitted data.

24. A data transmission method as set forth in claim 18, wherein further comprising a key encoding step for encoding a work key information to generate decoding key information.

25. A data transmission method as set forth in claim 24, wherein the encoding step generates encoded data from the data based on the work key information and the destination information of the transmitted data.

26. A data transmission method as set forth in claim 18, wherein the first transmission control information includes an address defined by an Internet protocol as the destination information.

27. A data transmission method as set forth in claim 26, wherein the encoding step encodes the transmitted data including the first transmission control information.

28. A data transmission method as set forth in claim 26, wherein the encoding step adds to the transmitted data second transmission control information including the same destination information as the destination information included in the first transmission control information to generate the encoded data.

29. A data transmission method as set forth in claim 28, wherein the encoding step adds to the encoded data a CRC check bit.

30. A data transmission method as set forth in claim 28, wherein the second transmission control information includes information indicating the presence of coding of the data to be transmitted.

31. A data transmission method as set forth in claim 30, wherein the second transmission control information includes information for distinguishing whether the data to be transmitted is information responding to a request from a receiving apparatus or whether it is control information for operating the communications system including the data transmitting apparatus.

32. A data transmission method in a transmitting apparatus connected to a first transmission system and a second transmission system and connected to at least one data reception apparatus for decoding a received encoded data by using a decoding key, the data transmission method comprising:

a key receiving step for receiving encoding key information for encoding encoded data along with destination information associated with the encoded data to be transmitted to the first transmission system, from the data reception apparatus through the second transmission system, a data generating step for adding control information including transmssion information indicating a destination information of a data receiving apparatus to which transmission data is transmitted, to the data to be encoded and transmitted to generate the transmission data, an encoding step for generating encoded data from the transmission data based on the encoding key information, and a data transmitting step for transmitting the encoded data generated in the encoding step to the first transmission system.

33. A data transmission method as set forth in claim 32, wherein the encoding step includes a key decoding step for decoding the encoding key information to generate work key information, and uses the work key information decoded by the key decoding step to generate encoded data.

34. A data transmission method as set forth in claim 33, wherein the encoding step generates encoded data based on the work key information and the destination information of the encoded data.

35. A data receiving apparatus connected to a first transmission system through which encoded data is transmitted and a second transmission system through which key information is transmitted, the data receiving apparatus comprising:

a key receiving means for receiving decoding key information for decoding encoded data and destination information of the encoded data received from the first transmission system, from the second transmission system, a data receiving means for receiving the decoded data from the first transmission system, a data restoring means for deleting first transmission control information including transmission information indicating a destination information of a data receiving apparatus to which a transmission data is transmitted from the encoded data, and a decoding means for decoding the encoded data from which the first transmission control information was deleted, based on the decoding key information to generate decoded data.

36. A data receiving apparatus as set forth in claim 35, wherein the communication capacity per unit time of the first transmission system is larger than the communication capacity per unit time of the second transmission system.

37. A data receiving apparatus as set forth in claim 36, wherein the first transmission system includes a satellite transmission line.

38. A data receiving apparatus as set forth in claim 36, wherein the second transmission system includes a cable transmission line.

39. A data receiving apparatus as set forth in claim 35, wherein a plurality of receiving apparatuses are connected to the first transmission system and the second transmission system, and the key receiving means receives the same decoding key information and destination information as other receiving apparatuses connected to a first transmission system and a second transmission system.

40. A data receiving apparatus as set forth in claim 35, wherein the decoding means generates decoded data from the received data based on the decoding key information and the destination information of the encoded data.

41. A data receiving apparatus as set forth in claim 35, wherein the decoding means includes key decoding means for decoding the decoding key information to generate work key information, and uses the work key information generated by the key decoding means to decode the encoded data.

42. A data receiving apparatus as set forth in claim 41, wherein the decoding means decodes the encoded data based on the work key information and the destination information of the encoded data.

43. A data receiving apparatus as set forth in claim 35, wherein the first transmission control information includes an address defined by an Internet protocol as the destination information.

44. A data receiving apparatus as set forth in claim 35, wherein the decoding means decodes the encoded data which was encoded including the first transmission control information.

45. A data receiving apparatus as set forth in claim 35, wherein it further comprises a judgment means for judging if the encoded data is directed to itself based on the second transmission control information including the same destination information as the destination information included in the first transmission control information of the encoded data.

46. A data receiving apparatus as set forth in claim 45, wherein the judgement means judges whether the encoded data is directed to itself and checks the CRC check bit added to the encoded data check for errors.

47. A data receiving apparatus as set forth in claim 45, wherein the judgement means judges whether the encoded data is directed to itself and decides whether to decode or not based on the information indicating the presence of encoding included in the second transmission control information.

48. A data receiving apparatus as set forth in claim 47, wherein the second transmission control information includes information for distinguishing whether the received data is information responding to a request from its own receiving apparatus or whether it is control information for operating the communications system including the receiving apparatus.

49. A data receiving apparatus connected to a first transmission system through which encoded data is transmitted and a second transmission system through which key information is transmitted, the data receiving apparatus comprising:

a key transmitting means for transmitting encoding key information for producing encoded data along with destination information associated with the encoded data received from the first transmission system, to the second transmission system, a data receiving means for receiving the encoded data encoded based on the encoding key information from the first transmission system, a data restoring means for deleting the first transmission control information including transmission information indicating destination information of a data receiving apparatus to which a transmission data is transmitted, from the encoded data, and a decoding means for decoding the encoded data based on decoding key information corresponding to the encoding key information.

50. A data receiving apparatus as set forth in claim 49, further comprising a key encoding means for encoding work key information to generate encoding key information.

51. A data receiving apparatus as set forth in claim 50, wherein the decoding means comprises a decoding key generating means for generating a decoding key based on the work key information and the destination information of the encoded data, and decodes the encoded data based on the decoding key generated by the decoding key generating means.

52. A data receiving method in a receiving apparatus connected to a first transmission system through which encoded data is transmitted and a second transmission system through which key information is transmitted, and decoding a received encoded data using a decoding key, the data receiving method comprising:

a key receiving step for receiving decoding key information for decoding encoded data along with destination information associated with the encoded data received from the first transmission system, from the second transmission system, a data receiving step for receiving the decoded data from the first transmission system, a data restoring step for deleting first transmission control information including transmission information including transmission information indicating a destination information of a data receiving apparatus to which a transmission data is transmitted, from the encoded data, and a decoding step for decoding the encoded data from which the first transmission control information was deleted based on the decoding key information to generate decoded data.

53. A data receiving method as set forth in claim 52, wherein the communication capacity per unit time of the first transmission system is larger than the communication capacity per unit time of the second transmission system.

54. A data receiving method as set forth in claim 53, wherein the first transmission system includes a satellite transmission line.

55. A data receiving method as set forth in claim 53, wherein the second transmission system includes a cable transmission line.

56. A data receiving method as set forth in claim 52, wherein the key receiving step receives the same decoding key information and destination information as other receiving apparatuses connected to the first transmission system and the second transmission system.

57. A data receiving method as set forth in claim 52, wherein the decoding step generates decoded data from the encoded data based on the decoding key information and the destination information of the encoded data.

58. A data receiving method as set forth in claim 52, wherein the decoding step includes key decoding step for decoding the decoding key information to generate work key information, and uses the work key information generated by the key decoding step to decode the encoded data.

59. A data receiving method as set forth in claim 58, wherein the decoding step decodes the encoded data based on the work key information and the destination information of the encoded data.

60. A data receiving method as set forth in claim 52, wherein the first transmission control information includes an address defined by an Internet protocol as the destination information.

61. A data receiving method as set forth in claim 52, wherein the decoding step decodes the encoded data which was encoded including the first transmission control information.

62. A data receiving method as set forth in claim 52, wherein further comprising a judgement step for judging whether the encoded data is directed to itself based on a second transmission control information including the same destination information as the destination information included in the first transmission control information of the encoded data.

63. A data receiving method as set forth in claim 62, wherein the judgement step judges whether the encoded data is directed to itself and checks to the CRC check bit added to the encoded data to check for errors.

64. A data receiving method as set forth in claim 62, wherein the judgement step judges whether the encoded data is directed to itself and decides whether to decode or not based on the information indicating the presence of encoding included in the second transmission control information.

65. A data receiving method as set forth in claim 64, wherein the second transmission control information includes information for distinguishing whether the received data is information responding to a request from its own receiving apparatus or whether it is control information for operating the communications system including the receiving apparatus.

66. A data receiving method in a receiving apparatus connected to a first transmission system through which encoded data is transmitted and a second transmission system through which key information is transmitted, and decoding a received encoded data using a decoding key, the data receiving method comprising:

a key transmitting step for transmitting encoding key information for producing encoding data along with destination information associated with the encoding data received from the first transmission system, to the second transmission system, a data receiving step for receiving the encoded data encoded based on the encoding key information from the first transmission system, a data restoring step for deleting the first transmission control information including transmission information indicating a destination information of a data receiving apparatus to which a transmission data is transmitted, from the encoded data, and a decoding step for decoding the encoded data from which the first transmission control information was deleted, based on decoding key information corresponding to the encoding key information.

67. A data receiving method as set forth in claim 66, wherein it further comprises a key encoding step for encoding work key information to general encoding key information.

68. A data receiving method as set forth in claim 67, wherein the decoding step includes a decoding key generating step for generating decoding key information based on the work key information and the destination information of the encoded data, and decodes the encoded data based on the decoding key generated by the decoding key generating step.

69. A data transmission system comprising a data transmitting apparatus encoding a transmission data and transmitting the same and a data receiving apparatus receiving the encoded data by using a decoding key and decoding a received encoded data, the data transmitting apparatus and the data receiving apparatus being connected to a first transmission system through which encoded data is transmitted and a second transmission system through which key information is transmitted, the data transmission system comprising:

a data transmitting apparatus having
a key transmitting means for transmitting decoding key information for decoding the encoded data along with destination information associated with the encoded data to be transmitted to the first transmission system to the second transmission system,
a data generating means for generating transmitted data added with first transmission control information including transmission information indicating a destination information of a data receiving apparatus to which a transmission data is transmitted, from the data to be encoded and transmitted, an encoding means for generating encoded data from the transmitted data based on encoding key information corresponding to the decoding key information, and a data transmitting means for transmitting through the first transmission system the encoded data generated by the encoding means and the data receiving apparatus having a key receiving means for receiving from the second transmission system decoding key information for decoding the encoded data along with destination information associated with the encoded data received from the first transmission system, a data receiving means for receiving the encoded data from the first transmission system, data restoring means for deleting first transmission control information from the encoded data, and a decoding means for decoding the encoded data from which the first transmission control information was deleted, based on the decoding key information.

70. A data transmission system comprising a data transmitting apparatus encoding a transmission data and transmitting the same and a data receiving apparatus receiving the encoded data by using a decoding key and decoding a received encoded data, the data transmitting apparatus and the data receiving apparatus being connected to a first transmission system through which encoded data is transmitted and a second transmission system through which key information is transmitted, the data transmission system comprising:

the data transmitting apparatus having a key receiving means for receiving encoding key information for encoding the encoded data along with destination information associated with the encoded data to be transmitted to the first transmission system, from the second transmission system, a data generating means for generating transmitted data added with control information from the data to be encoded and transmitted, an encoding means for generating encoded data from the transmitted data based on encoding key information, and a data transmitting means for transmitting through the first transmission system the encoded data generated by the encoding means and a data receiving apparatus having a key transmitting means for transmitting through the second transmission system encoding key information for preparing the encoded data along with destination information associated with the encoded data received from the first transmission system, a data receiving means for receiving the encoded data encoded based on the encoding key information from the first transmission system, a data restoring means for deleting first transmission control information from the encoded data, and a decoding means for decoding the encoded data from which the first transmission control information was deleted, based on decoding key information corresponding to the encoding key information.

71. A data transmission method using a transmission system having a first transmission system and a second transmission system, the data transmission method comprising:

transmitting processing step having key transmitting step for transmitting through the second transmission system decoding key information for decoding the encoded data along with destination data associated with the encoded data transmitted through the first transmission system, generating step for adding first transmission control information to the data encoded or to be encoded, encoding step for generating encoded data from the data based on encoding key information corresponding to the decoding key information, and data transmitting step for transmitting through the first transmission system the encoded data, and receiving processing step having key receiving step for receiving from the second transmission system decoding key information for decoding the encoded data along with destination information associated with the encoded data received from the first transmission system, data receiving step for receiving the encoded data from the first transmission system, restoring step for removing the first transmission control information from the data decoded or to be decoded, and decoding step for decoding the encoded data based on the decoding key information.

72. A data transmission method for transmission of data using a transmission system having a first transmission system and a second transmission system, the data transmission system method comprising:

a transmitting processing step having key receiving step for receiving from the second transmission system encoding key information for encoding the encoded data along with destination data associated with the encoded data transmitted through the first transmission system, generating step for adding first control information to the data encoded or to be encoded, encoding step for generating encoded data from the data based on encoding key information, and data transmitting step for transmitting through the first transmission system the encoded data, and receiving processing step having key transmitting step for transmitting through the second transmission system encoding key information for preparing the encoded data along with destination information associated with the encoded data received from the first transmission system, data receiving step for receiving the encoded data encoded based on the encoding key information from the first transmission system, decoding step for decoding the encoded data based on decoding key information corresponding to the encoding key information.

* * * * *